(12) United States Patent
Asai

(10) Patent No.: US 7,821,694 B2
(45) Date of Patent: Oct. 26, 2010

(54) OPTICAL SCAN DEVICE, IMAGE DISPLAY DEVICE, METHOD OF MODIFYING RESONANCE FREQUENCY OF OPTICAL SCANNER, AND METHOD OF CORRECTING POSITION OF REFLECTION MIRROR

(75) Inventor: Nobuaki Asai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 334 days.

(21) Appl. No.: 12/010,174

(22) Filed: Jan. 22, 2008

(65) Prior Publication Data
US 2008/0144154 A1    Jun. 19, 2008

Related U.S. Application Data

(63) Continuation-in-part of application No. PCT/JP2006/314376, filed on Jul. 20, 2006.

(30) Foreign Application Priority Data
Jul. 21, 2005   (JP)   ............... 2005-211843

(51) Int. Cl.
*G02B 26/08* (2006.01)
(52) U.S. Cl. .................................. 359/224.1
(58) Field of Classification Search ... 359/212.1–214.1, 359/223.1–226.1; 250/234–236
See application file for complete search history.

(56) References Cited
U.S. PATENT DOCUMENTS
6,449,079 B1 * 9/2002 Herrmann ................ 359/214.1

7,203,394 B2 * 4/2007 Wiegele et al. ............... 385/18
2005/0219674 A1   10/2005 Asai et al.

FOREIGN PATENT DOCUMENTS
JP   A-07-174569   7/1995

(Continued)

OTHER PUBLICATIONS

Muralt et al., "Piezoelectric actuation of PZT thin-film diaphragms at static and resonant conditions," *Sensors and Actuators*, vol. 53, 1996, pp. 398-404.
Guirardel et al., "PZT polarization voltage effects on off-centered PZT patch actuating silicon membrane," *Sensors and Actuators*, vol. 110, 2004, pp. 385-389.

(Continued)

*Primary Examiner*—Euncha P Cherry
(74) *Attorney, Agent, or Firm*—Oliff & Berridge, PLC

(57) ABSTRACT

The present invention properly adjusts a resonance frequency of an optical scanner. A resonance-type optical scanner includes a reflection mirror which reflects incident light, a first beam portion which is connected to one side of the reflection mirror, a second beam portion which is connected to the other side of the reflection mirror, and first piezoelectric element portions for elastically deforming the first beam portion. By applying a DC voltage component to the first piezoelectric element portions of the resonance-type optical scanner, tension of the first beam portion and tension of the second beam portion are changed. In response to the changes of tensions of the first beam portion and the second beam portion, the resonance frequency of the optical scanner is changed. In a state that a DC voltage component is applied to the first piezoelectric element portions, an AC voltage is applied to the first piezoelectric element portions so as to oscillate the reflection mirror of the optical scanner at a predetermined frequency.

15 Claims, 17 Drawing Sheets

FOREIGN PATENT DOCUMENTS

| | | |
|---|---|---|
| JP | A-07-181415 | 7/1995 |
| JP | B2-2981600 | 9/1999 |
| JP | A-2004-191953 | 7/2004 |
| JP | A-2005-181477 | 7/2005 |
| WO | WO 2005/059624 A1 | 6/2005 |

OTHER PUBLICATIONS

Wang et al., "Effect of DC bias field on the complex materials coefficients of piezoelectric resonators," *Sensors and Actuators*, vol. 109, 2003, pp. 149-155.

* cited by examiner

Fig.6B
⟨WHEN TENSION IS HIGH⟩
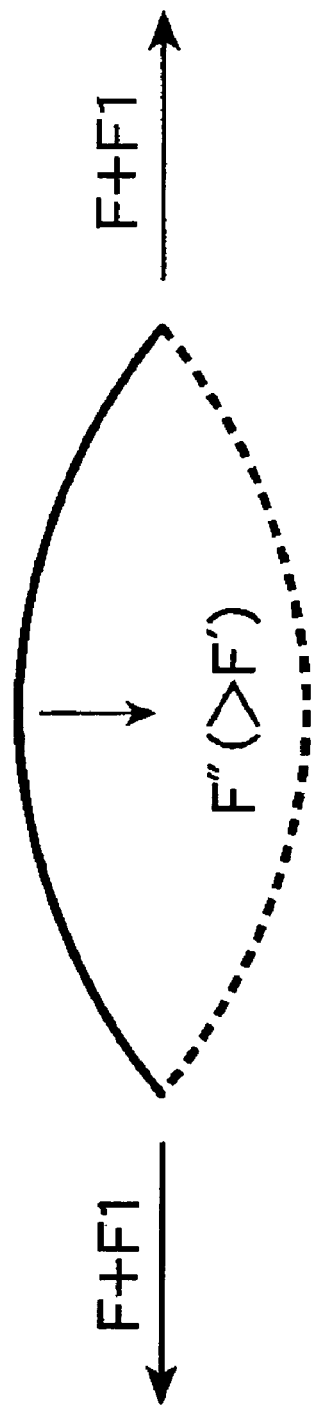
⟨WHEN TENSION IS LOW⟩
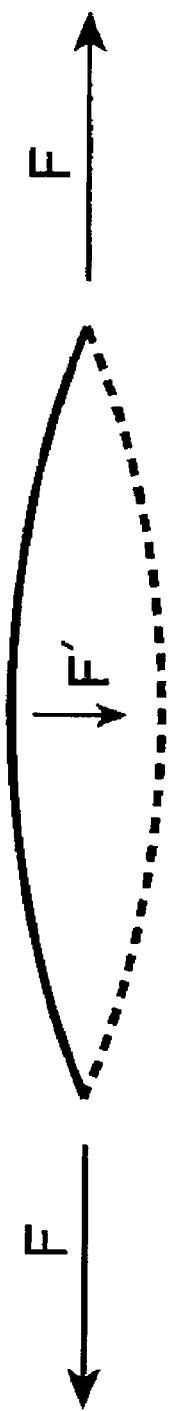

OPTICAL SCAN DEVICE, IMAGE DISPLAY DEVICE, METHOD OF MODIFYING RESONANCE FREQUENCY OF OPTICAL SCANNER, AND METHOD OF CORRECTING POSITION OF REFLECTION MIRROR

CROSS-REFERENCE TO RELATED APPLICATIONS

The present application is a Continuation-in-Part of International Application No. PCT/JP2006/314376 filed Jul. 20, 2006, which claims the benefits of Japanese Patent Applications No. 2005-211843 filed Jul. 21, 2005.

BACKGROUND OF THE INVENTION

1. Field of the Invention

The present invention relates to a technique on an optical scan device or an image display device which includes an optical scanner having a reflection mirror capable of reflecting incident light and performs optical scanning by changing an angle made by the reflection mirror and an incident direction of the incident light, and more particularly to a method of changing a resonance frequency of the optical scanner, and a method of correcting a position of the reflection mirror and the like.

2. Description of the Related Art

As an optical scanner which scans light, there has been already known an optical scanner which includes a reflection mirror for reflecting incident light and performs scanning of reflection light from a reflection surface of the reflection mirror by changing an angle of the reflection surface, that is, an angle made by the reflection surface of the reflection mirror and an incident direction of the incident light.

This type of optical scanner has been used in the field of image formation and the field of image reading, for example. In the field of image formation, the optical scanner is used in applications such as a retina-scanning-type display device which directly scans a luminous flux and directly displays an image on a retina, a projector, a laser printer and laser lithography. On the other hand, in the field of image reading, the optical scanner is used in applications such as a facsimile, a copier, an image scanner and a bar-code reader.

Here, as a method of scanning reflection light using such an optical scanner, there has been known a method which scans the reflection light by oscillating a reflection surface of a reflection mirror. Here, the reflection surface is oscillated by oscillating a resiliently deformable portion which is connected to the reflection surface at a resonance frequency.

However, such an optical scanner makes use of resonance oscillations and hence, the optical scanner is highly dependent on resonance characteristic. Since the resonance characteristic possesses temperature dependency, when an ambient temperature is changed, the resonance frequency of the optical scanner is changed. Further, when the optical scanner is oscillated and a temperature of a resiliently deformable portion is elevated due to heat generated in the inside of the optical scanner, the resonance frequency is changed in the same manner. Further, due to irregularities in characteristics among the respective optical scanners which occur at the time of manufacturing the optical scanner, the resonance frequency may be deviated from a targeted resonance frequency.

When the resonance frequency is deviated from the targeted resonance frequency in this manner, oscillation amplitude of the resiliently deformable portion, that is, a scanning angle becomes small and hence, it is not possible to obtain a desired scanning angle. Accordingly, there has been proposed an optical scanner which feedbacks a signal having a magnitude corresponding to oscillation amplitude of a reflection mirror and allows the reflection mirror to perform the self oscillations at a resonance frequency for acquiring the maximum oscillation amplitude (see JP-A-7-181415 (patent document 1), for example). Further, there has been also proposed an optical scanner which can adjust a resonance frequency of a resiliently deformable portion which is connected to a reflection surface of a reflection mirror. In this optical scanner, a piezoelectric element is formed on the resiliently deformable portion. By applying a voltage to the piezoelectric element, a width, a thickness or a length of the resiliently deformable portion is changed and hence, a spring constant of the resiliently deformable portion is changed whereby the resonance frequency of the resiliently deformable portion can be adjusted (see Japanese Patent No. 2981600 (patent document 2), for example).

SUMMARY OF THE INVENTION

With the above-described constitution, the optical scanner disclosed in patent document 1 can ensure a stable scanning angle even when the ambient temperature is largely changed. However, the optical scanner is not configured to set the resonance frequency to a desired scanning frequency and hence, there arises a drawback that reflection light cannot be scanned at the desired frequency.

Further, with the above-described constitution, the optical scanner disclosed in patent document 2 can scan reflection light at a desired scanning frequency by adjusting a resonance frequency. However, a pressure is applied to the reflection surface by the piezoelectric element in a direction perpendicular to the reflection surface. Accordingly, the reflection surface is inclined from a perpendicular surface and hence, there arises a drawback that a reflection angle of light with respect to the reflection mirror is changed.

To overcome such drawbacks, according to one aspect of the present invention, there is provided an optical scan device which includes: a resonance-type optical scanner having a reflection mirror which reflects incident light, a first beam portion which is connected to one side of the reflection mirror, a second beam portion which is connected to the other side of the reflection mirror and a first piezoelectric element portion which resiliently deforms the first beam portion; and a power source part which applies an AC voltage for oscillating the reflection mirror to the first piezoelectric element portion, wherein the power source part applies a DC voltage component to the first piezoelectric element portion.

To overcome the above-mentioned drawbacks, according to another aspect of the present invention, there is provided an optical scan device which includes: a resonance-type optical scanner including a reflection mirror which reflects incident light, a first beam portion connected to one side of the reflection mirror, a second beam portion connected to the other side of the reflection mirror, a first piezoelectric element portion which resiliently deforms the first beam portion, and a second piezoelectric element portion which resiliently deforms the second beam portion; a power source part which applies an AC voltage for oscillating the reflection mirror to the first piezoelectric element portion, wherein the power source part applies a DC voltage component to the second piezoelectric element portion.

Further, to overcome the above-mentioned drawbacks, according to still another aspect of the present invention, in a method of changing a resonance frequency of an oscillator of a resonance-type optical scanner including a reflection mirror which reflects incident light, a first beam portion which is connected to one side of the reflection mirror, a second beam portion which is connected to the other side of the reflection mirror and a first piezoelectric element portion which resiliently deforms the first beam portion, the method includes the steps of applying an AC voltage to the first piezoelectric element portion so as to oscillate the reflection mirror, detecting a displacement range of the reflection mirror, and applying a DC voltage component to the first piezoelectric element portion based on the displacement range of the reflection mirror.

Further, to overcome the above-mentioned drawbacks, according to still another aspect of the present invention, in a method of changing a resonance frequency of an oscillator of a resonance-type optical scanner including a reflection mirror which reflects incident light, a first beam portion which is connected to one side of the reflection mirror, a second beam portion which is connected to the other side of the reflection mirror, a first piezoelectric element portion which resiliently deforms the first beam portion and a second piezoelectric element portion which resiliently deforms the second beam portion, the method includes the steps of applying an AC voltage to the first piezoelectric element portion so as to oscillate the reflection mirror, detecting a displacement range of the reflection mirror, and applying a DC voltage component to the second piezoelectric element portion based on the displacement range of the reflection mirror.

Further, to overcome the above-mentioned drawbacks, according to still another aspect of the present invention, in a method of correcting a reflection mirror position of a resonance-type optical scanner including a reflection mirror which reflects incident light, a first beam portion which is connected to one side of the reflection mirror, a second beam portion which is connected to the other side of the reflection mirror, a first piezoelectric element portion which resiliently deforms the first beam portion, and a second piezoelectric element portion which resiliently deforms the second beam portion, the method includes the steps of detecting a position of the reflection mirror, and applying a DC voltage component to the first piezoelectric element portion and/or the second piezoelectric element portion based on the displacement range of the reflection mirror.

BRIEF DESCRIPTION OF THE DRAWINGS

FIG. 6A to FIG. 6C are views showing a principle of change of resonance frequency of the optical scanner;

DESCRIPTION OF THE PREFERRED EMBODIMENT

Hereinafter, several embodiments which embody the present invention are specifically explained in conjunction with drawings with respect to the whole constitution and the manner of operation of an image display device, the whole constitution and the manner of operation of an optical scanner, changing of a resonance frequency of the optical scanner, and changing of the inclination of a reflection mirror in this order.

First Embodiment

[1. Explanation of the Whole Image Display Device 1]

First of all, the whole constitution of an image display device 1 and the manner of operation of the image display device 1 are explained.

Figure 1:
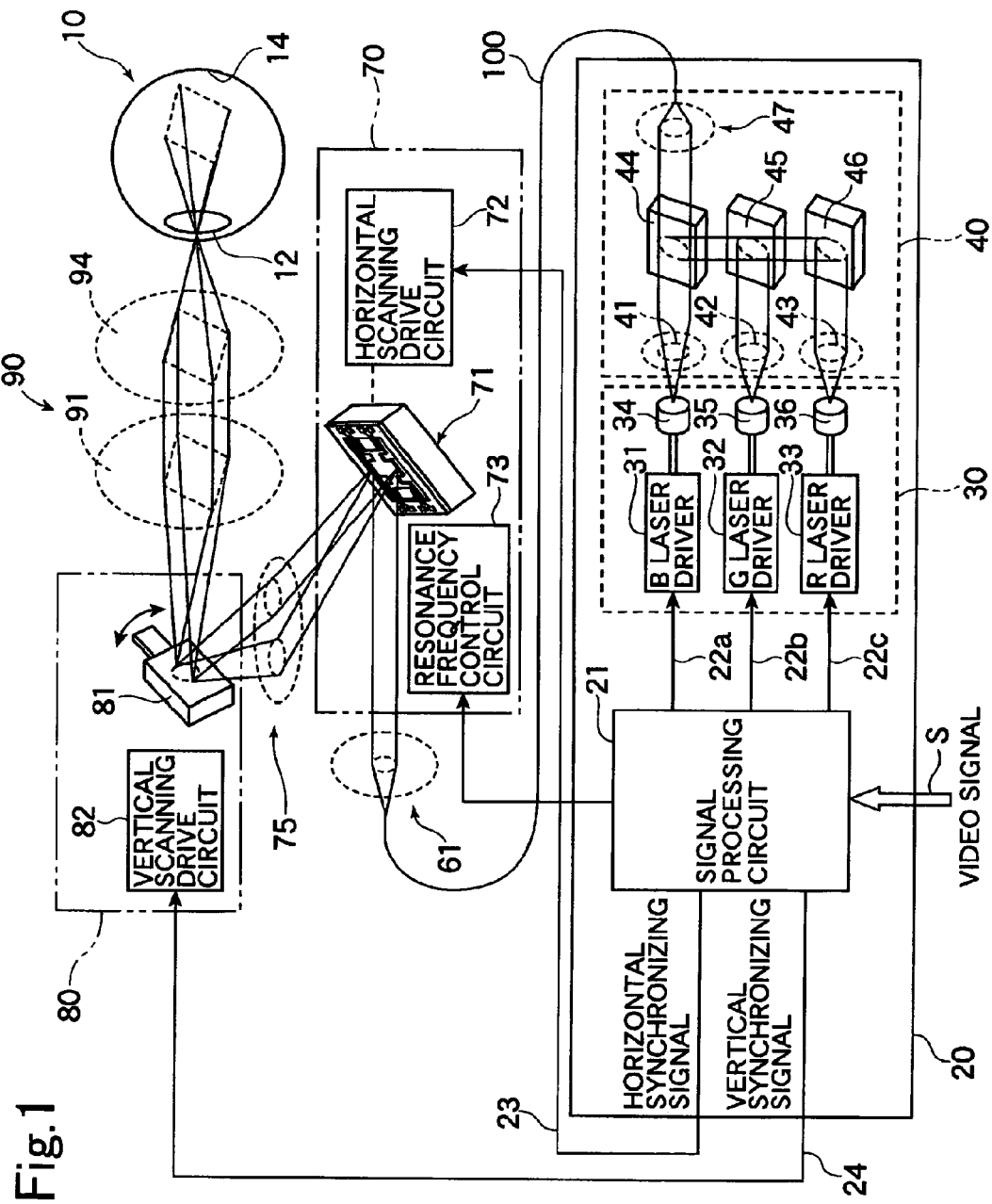
FIG. 1 is a view showing the whole constitution of an image display device according to an embodiment of the present invention.

FIG. 1 shows the whole constitution of the image display device 1 of the embodiment 1. The image display device 1 is of a type which emits a luminous flux onto a pupil 12 of a viewer and projects an image on his/her retina 14. Due to such a constitution, the image display device allows the viewer to visually recognize a virtual image in front of the pupil 12 of a viewer's eye 10. This device is also referred to as a retina-scanning-type display.

The image display device 1 includes a luminous flux generator 20 which generates a luminous flux (laser beams) whose intensity is modulated based on a video signal S supplied from the outside. Further, the image display device 1 includes, between the luminous flux generator 20 and the viewer's eye 10, a collimation optical system 61 which collimates the luminous flux generated by the luminous flux generator 20 and radiated from an optical fiber 100, a horizontal scanning part 70 which scans the luminous flux collimated by the collimation optical system 61 in a horizontal direction for image display, a vertical scanning part 80 which scans the luminous flux scanned in the horizontal direction using the horizontal scanning part 70 in a vertical direction for image display, a relay optical system 75 which is formed between the horizontal scanning part 70 and the vertical scanning part 80, and a relay optical system 90 which radiates the luminous fluxes scanned in the horizontal direction as well as in the vertical direction (hereinafter, referred to as "scanned luminous flux") onto the pupil 12.

As shown in FIG. 1, the luminous flux generator 20 includes a signal processing circuit 21. A video signal S supplied from the outside is inputted to the signal processing circuit 21. Based on the video signal S, the signal processing circuit 21 generates respective signals and the like which constitute components for synthesizing an image. The signals generated by the signal processing circuit 21 include video signals 22a to 22c of blue (B), green (G) and red (R), a horizontal synchronizing signal 23 used in the horizontal scanning part 70, a vertical synchronizing signal 24 used in the vertical scanning part 80 and the like.

Further, the luminous flux generator 20 includes a light source part 30 which forms three video signals (B, R, G) 22a to 22c outputted from the signal processing circuit 21 into luminous fluxes respectively, and an optical synthesizing part 40 which generates an arbitrary luminous flux by combining these three luminous fluxes into one luminous flux.

The light source part 30 includes a B laser 34 which generates a blue luminous flux, a B laser drive circuit 31 which drives the B laser 34, a G laser 35 which generates a green luminous flux, a G laser drive circuit 32 which drives the G laser 35, an R laser 36 which generates a red luminous flux, and an R laser drive circuit 33 which drives the R laser 36. Here, the respective lasers 34, 35, 36 may be constituted of a semiconductor laser or a solid-state laser with a harmonics generation mechanism, for example.

The optical synthesizing part 40 includes collimation optical systems 41, 42, 43 provided for collimating the luminous fluxes incident from the light source part 30, dichroic mirrors 44, 45, 46 provided for synthesizing the collimated luminous fluxes, and a coupling optical system 47 which guides a synthesized luminous flux into the optical fiber 100.

The luminous fluxes radiated from the respective lasers 34, 35, 36 are, after respectively being collimated by the collimation optical systems 41, 42, 43, incident on the dichroic mirrors 44, 45, 46. Thereafter, using these dichroic mirrors 44, 45, 46, the respective luminous fluxes are reflected on the dichroic mirrors 44, 45, 46 or are allowed to pass through the dichroic mirrors 44, 45, 46 selectively corresponding to wavelengths thereof.

To be specific, the blue luminous flux radiated from the B laser 34 is, after being collimated by the collimation optical system 41, incident on the dichroic mirror 44. The green luminous flux radiated from the G laser 35 is incident on the dichroic mirror 45 via the collimation optical system 42. The red luminous flux radiated from the R laser 36 is incident on the dichroic mirror 46 via the collimation optical system 43.

The luminous fluxes of three primary colors which are respectively incident on these three dichroic mirrors 44, 45, 46 are reflected on the dichroic mirrors 44, 45, 46 or are allowed to pass through the dichroic mirrors 44, 45, 46 selectively corresponding to wavelengths thereof, and arrive at the coupling optical system 47 and are converged by the coupling optical system. Then, the converged luminous fluxes are outputted to the optical fiber 100.

The horizontal scanning part 70 and the vertical scanning part 80, to bring the luminous fluxes incident from the optical fiber 100 into a state which allows the luminous fluxes to be projected as an image, scan the luminous fluxes in a horizontal direction as well as in a vertical direction to form the luminous fluxes into scanned luminous fluxes. The horizontal scanning part 70 and the signal processing circuit 21 which includes a constitutional portion for performing horizontal scanning function as a horizontal optical scan device, while the vertical scanning part 80 and the signal processing circuit 21 which includes a constitutional portion for performing vertical scanning function as a vertical optical scan device. Here, the horizontal optical scan device or the vertical optical scan device corresponds to the optical scan device of the present invention.

The horizontal scanning part 70 includes an optical scanner 71 for scanning the luminous fluxes in the horizontal direction, a horizontal scanning drive circuit 72 which drives the optical scanner 71, and a resonance frequency control circuit 73 which controls a resonance frequency of the optical scanner 71, while the vertical scanning part 80 includes a Galvano mirror 81 which is an optical scanner for scanning the luminous fluxes in the vertical direction, and a vertical scanning drive circuit 82 which drives the Galvano mirror 81. Here, the horizontal scanning drive circuit 72 and the vertical scanning drive circuit 82 respectively drive the optical scanner 71 and the Galvano mirror 81 based on a horizontal synchronizing signal 23 and a vertical synchronizing signal 24 which are outputted from the signal processing circuit 21.

Further, the image display device 1 includes a relay optical system 75 which relays the luminous fluxes between the horizontal scanning part 70 and the vertical scanning part 80. Light which is scanned in the horizontal direction using the optical scanner 71 passes through the relay optical system 75 and is scanned by the Galvano mirror 81 in the vertical direction, and is radiated to the relay optical system 90 as the scanned luminous fluxes.

The relay optical system 90 includes sets of lenses 91, 94. The scanned luminous fluxes for display radiated from the vertical scanning part 80, using the set of lenses 91, have center lines thereof arranged parallel to each other and are respectively converted into converged luminous fluxes. Then, using the set of lenses 94, the converged luminous fluxes are arranged substantially parallel and, at the same time, are converted such that the center lines of these luminous fluxes are converged on the pupil 12 of the viewer.

[2 Explanation of Optical Scanner 71]

Figure 2:
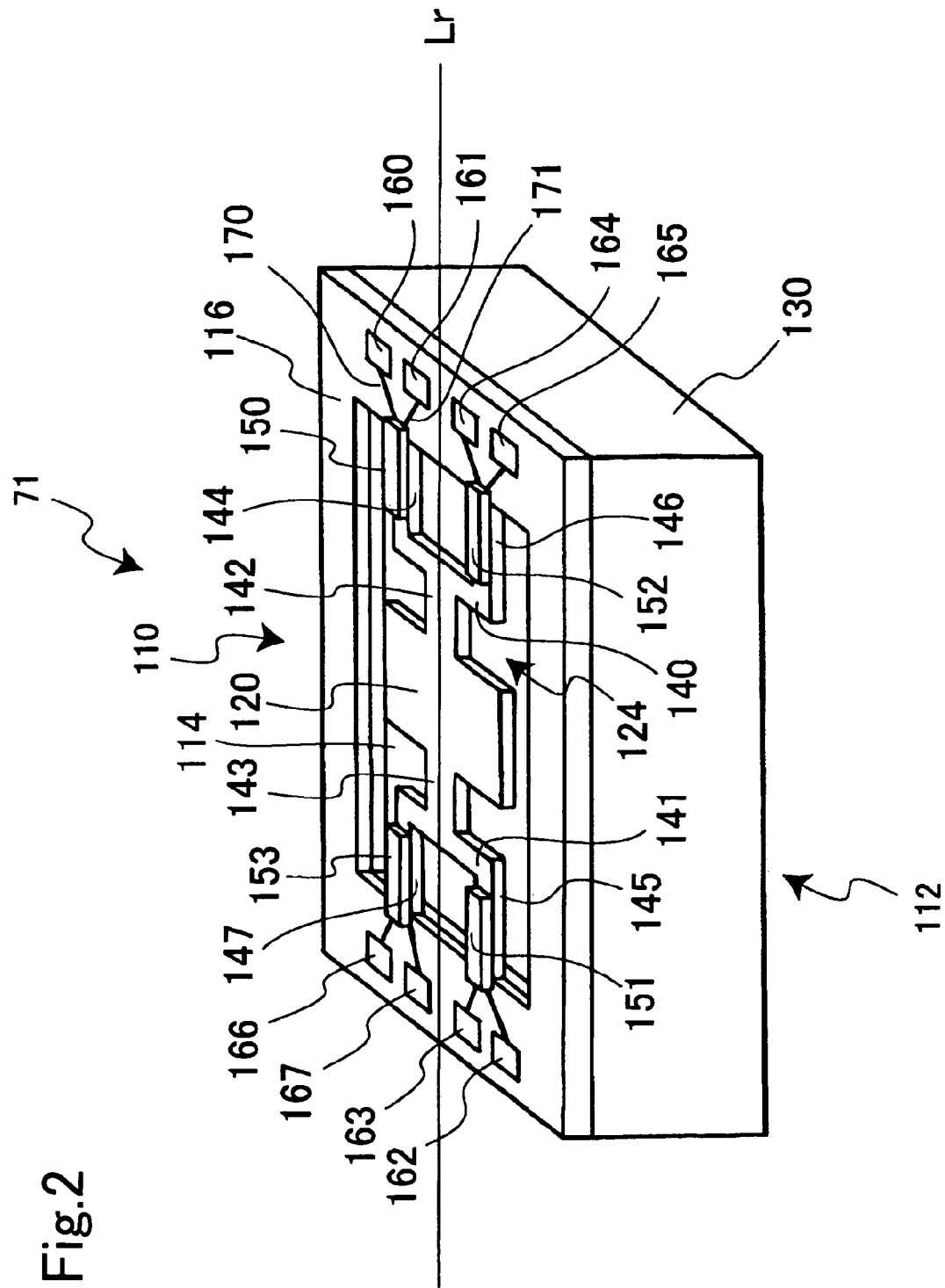
FIG. 2 is a perspective view showing an assembling state of an optical scanner.
Figure 3:
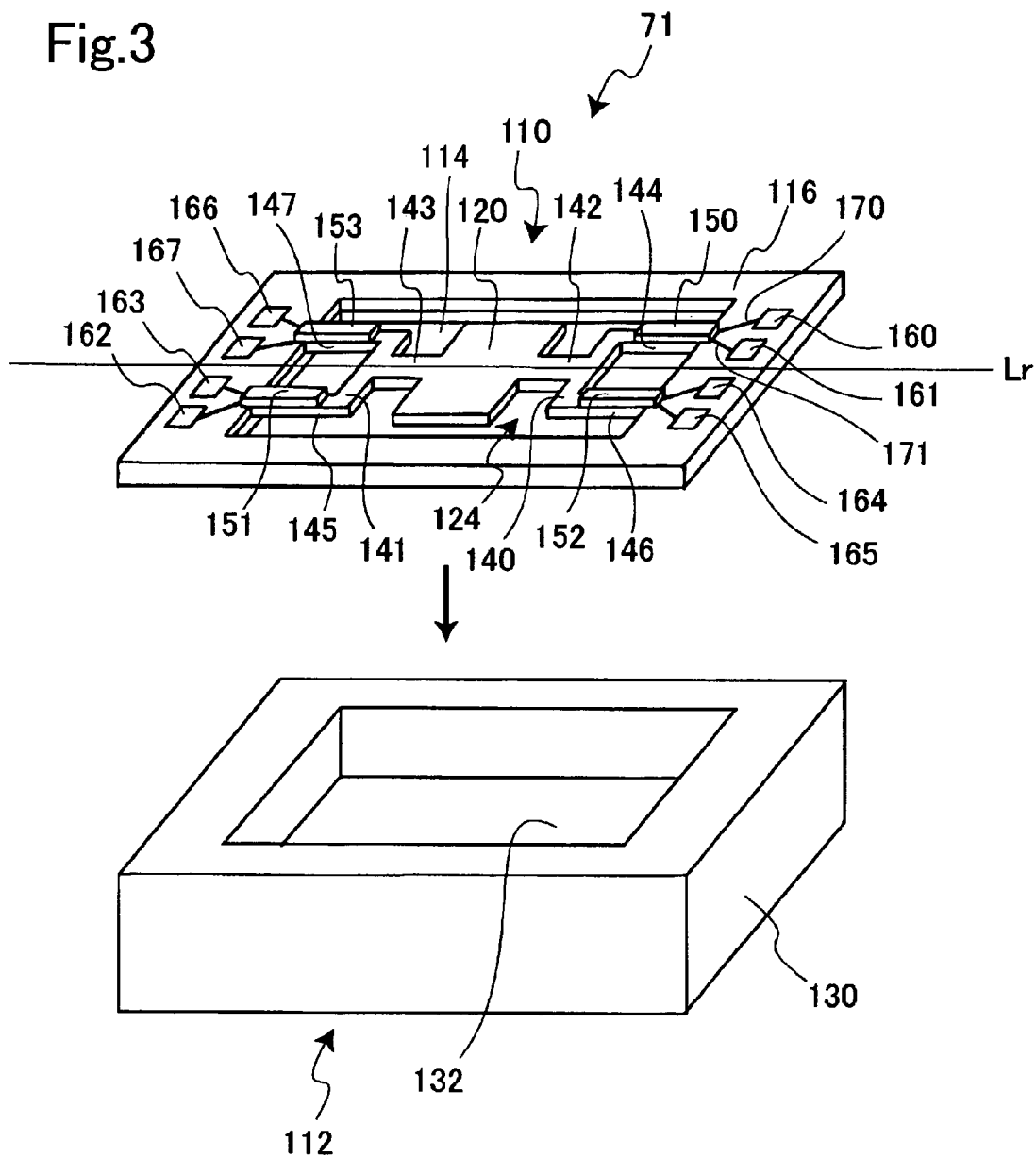
FIG. 3 is an exploded perspective view of the optical scanner.

Next, the constitution of the optical scanner which constitutes an oscillation-type horizontal scanning mechanism for scanning the luminous flux in the horizontal direction as described above is specifically explained hereinafter. FIG. 2 is a perspective view showing an assembled state of the optical scanner 71, and FIG. 3 is an exploded perspective view of the optical scanner 71. As shown in FIG. 2 and FIG. 3, the optical scanner 71 is constituted by mounting a body portion 110 on a base 112.

The optical scanner 71 is a resonance optical scanner of a resonance type. For scanning the light spot on the retina 14 in the horizontal direction, the optical scanner 71 oscillates an oscillating body 124 which includes a reflection mirror 120 for changing the radiation direction of the light beams by reflecting the light beams. In this embodiment, the oscillating body 124 is allowed to resonate. Due to such resonation of the oscillating body 124, it is possible to oscillate the reflection mirror 120.

As shown in FIG. 3, the optical scanner 71 includes an approximately rectangular parallelepiped base 112. A recessed portion 132 is formed in a center portion of an upper surface of the base 112 in an open state and, at the same time, a body portion 110 is fixedly secured to the upper surface of the base 112. Here, the base 112 is arranged in a state that the base 112 is fixedly mounted on the image display device 1 at a predetermined position.

The body portion 110 is made of a material having resiliency such as silicon. Piezoelectric element portions 150 to 153 and electrodes 181, 182 and the like described later are formed by a thin film forming method. The body portion 110, as shown in an upper part of FIG. 3, includes a through hole 114 which allows light to pass therethrough and has an approximately rectangular shape in a plan view. An outer side of the body portion 110 forms a frame body 116, while the oscillating body 124 having the reflection mirror 120 is formed on an inner side of the body portion 110.

Further, the oscillating body 124 is positioned above an opening of a recessed portion 132 formed in the base 112. The oscillating body 124 is configured such that the oscillating body 124 does not interfere with the base 112 even during the oscillation of the oscillating body 124. Here, the base 112 is extremely fine and hence, the recessed portion 132 is formed by etching, for example.

The oscillating body 124 is integrally formed of a plurality of constitutional elements. That is, the oscillating body 124 is formed of the reflection mirror 120, a first beam portion 140 which is connected to one side of the reflection mirror 120 and is formed of a plate-like resilient member 142, a pair of plate-like resilient members 144, 146, and a second beam portion 141 which is connected to the other side of the reflection mirror 120 and is formed of a plate-like resilient member 143, and a pair of a plate-like resilient members 145,147. Here, the resilient member 142 constitutes a first spring portion, and the resilient member 144 and the resilient member 146 constitutes a second spring portion. Further, the resilient member 143 corresponds to the first spring portion, and the resilient member 145 and the resilient member 147 constitutes the second spring portion.

The oscillating body 124 which is formed of the reflection mirror 120, the first beam portion 140 and the second beam portion 141 constitute a movable member which is movable relative to the fixed frame body 116 fixed to the image display device 1.

As shown in FIG. 3, the reflection mirror 120 has an approximately rectangular shape and is arranged at an approximately center portion of the body portion 110. The reflection mirror 120 is oscillated about an oscillation axis Lr which extends in the lateral direction in FIG. 3 to change the reflection direction of the luminous fluxes incident on the reflection mirror 120.

On one side of the reflection mirror 120, two resilient members, that is, the resilient member 144,146 which are arranged in parallel are branched from the resilient member 142 with a distance therebetween larger than a width of the resilient member 142. Two resilient members 144, 146 are arranged symmetrical with respect to the oscillation axis Lr. In the same manner, on the other side of the reflection mirror 120, two resilient members, that is, the resilient member 145, 147 which are arranged in parallel are branched from the resilient member 143 with a distance therebetween larger than a width of the resilient member 143. Two resilient members 145, 147 are arranged symmetrical with respect to the oscillation axis Lr. Further, the first beam portion 140 and the second beam portion 141 are arranged at positions which are symmetrical with respect to the reflection mirror 120.

A first piezoelectric element 150 and a second piezoelectric element 152 are respectively fixedly secured to one-side surfaces of the resilient members 144, 146 which form portions of the first beam portion 140. The first piezoelectric element 150 and the second piezoelectric element 152 respectively have one ends thereof fixedly secured to the fixed frame body 116 as fixed ends, and another ends thereof formed as free ends which are not fixedly secured to the fixed frame body 116. Here, a first piezoelectric element portion is constituted of the first piezoelectric element 150 and the second piezoelectric element 152.

Figure 4:
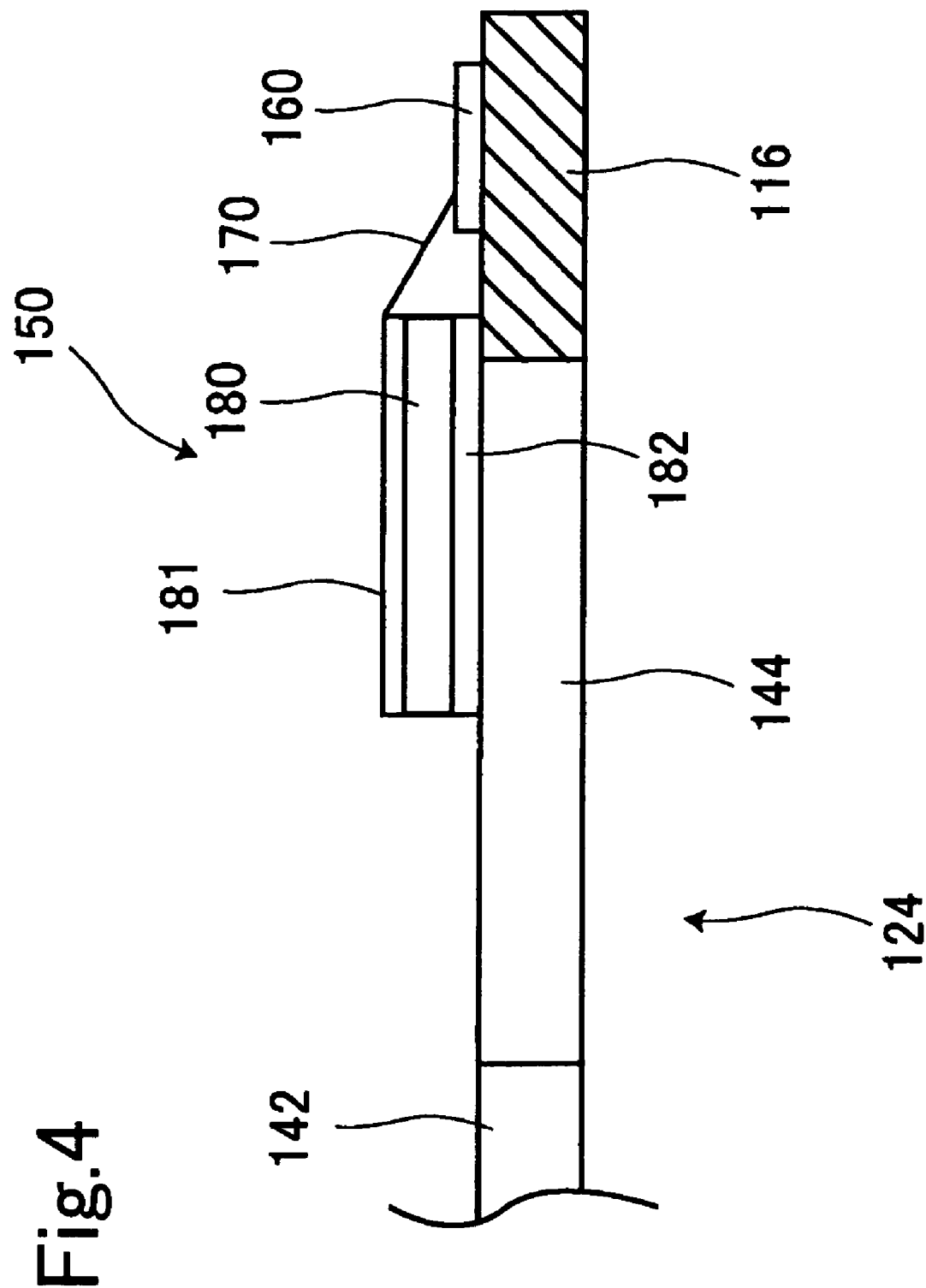
FIG. 4 is a partial side view of the optical scanner.

The first piezoelectric element 150 and the second piezoelectric element 152 have the same structure in which a piezoelectric body is sandwiched by an upper electrode and a lower electrode in the direction perpendicular to fixed surfaces of the first piezoelectric element 150 and the second piezoelectric element 152. FIG. 4 shows a side of the first piezoelectric element 150 mounted on an upper surface of the resilient member 144. The piezoelectric body 180 is sandwiched by the upper electrode 181 and the lower electrode 182.

Further, the upper electrode 181 and the lower electrode 182 of the first piezoelectric element 150 are respectively connected to input terminals 160, 161 which are mounted on the fixed frame body 116 using lead lines 170, 171. The upper electrode 181 and the lower electrode 182 of the second piezoelectric element 152 are respectively connected to input terminals 164, 165 which are mounted on the fixed frame body 116 respectively using lead lines.

In this embodiment, the first piezoelectric element 150 and the second piezoelectric element 152 which constitute a pair respectively function as driving sources and generate torsional oscillations about the oscillation axis Lr so as to oscillate the reflection mirror 120. This structure is specifically explained hereinafter.

When a voltage is applied between the upper electrode and the lower electrode of the first piezoelectric element 150, the first piezoelectric element is displaced not only in the voltage applying direction but also in the direction orthogonal to the voltage applying direction. Due to the generation of such displacements in the first piezoelectric element 150, the first piezoelectric element 150 is resiliently deformed and is bent upwardly or downwardly. Further, in the same manner, when a voltage is applied between the upper electrode and lower electrode of the second piezoelectric element 152, the second piezoelectric element 152 is also resiliently deformed and is bent upwardly or downwardly. Here, the upward bending or the downward bending of the piezoelectric element is controlled based on whether a voltage which is applied between the electrodes assumes positive polarity or negative polarity.

Further, corresponding to bending of the first piezoelectric element 150 due to resilient deformation, the resilient member 144 is also bent due to resilient deformation. In the same manner, corresponding to bending of the second piezoelectric element 152 due to resilient deformation, the resilient member 146 is also bent due to resilient deformation. Bending of the resilient members 144, 146 due to resilient deformation generates the rotation of the resilient member 142 due to the resilient deformation about the oscillating axis Lr which constitutes a center axis. Due to this rotation of the resilient member 142, the reflection mirror 120 is rotated about the oscillation axis Lr.

Figure 5:
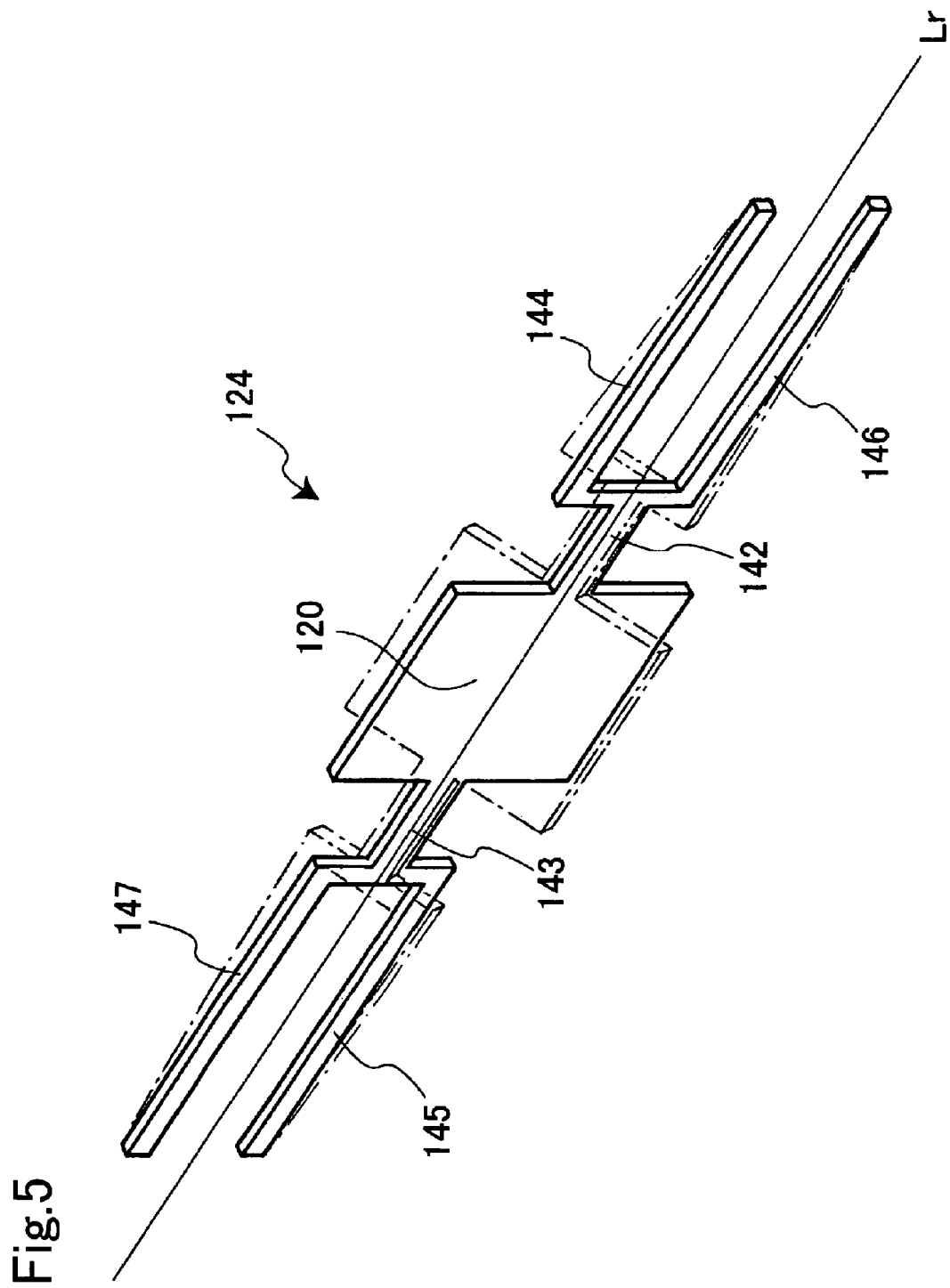
FIG. 5 is a view for explaining rotational oscillations of an oscillator.

Accordingly, by applying AC voltages having phases opposite to each other between the upper electrode and the lower electrode of the first piezoelectric element 150 and between the upper electrode and the lower electrode of the second piezoelectric element 152, the free ends of the first piezoelectric element 150 and the second piezoelectric element 152 are resiliently deformed and bent such that the free ends of the first piezoelectric element 150 and the second piezoelectric element are displaced in the directions opposite to each other, and the free ends of the first piezoelectric element 150 and the second piezoelectric element repeat upward and downward bending oscillations at a frequency of the AC voltage. The bending oscillations are converted into a rotational movement about the oscillation axis Lr which constitutes the center axis by way of the first beam portion 140 and hence, the reflection mirror 120 is rotated about the oscillation axis Lr as shown in FIG. 5.

To summarize the above-mentioned constitution and the manner of operation described heretofore, the resilient member 144 and the resilient member 146 have a function of converting linear displacements of the first piezoelectric element 150 and the second piezoelectric element 152 which are fixedly secured to the resilient member 144 and the resilient member 146 into bending oscillations. The resilient members 144, 146 also have a function of converting the bending oscillations into the rotational oscillations of the resilient member 142. In this manner, when the piezoelectric elements are used as driving sources which bias the springs, it is possible to easily miniaturize the device.

Further, the second beam portion 141 is positioned on the other side of the reflection mirror 120 as described above and is formed symmetrically with the first beam portion 140 with respect to the oscillation axis Lr, and the rotational oscillations generated by the first beam portion 140 are transmitted to the second beam portion 141 by way of the reflection mirror 120. As a result, the displacements similar to the displacements of the second beam portion 141 are generated. That is, about the oscillation axis Lr which constitutes the center axis, the resilient member 143 is resiliently deformed and is rotationally oscillated in the approximately same manner as the resilient member 142, and the resilient member 145 is resiliently deformed and generates the bending oscillations in the approximately same manner as the resilient member 146, and the resilient member 147 is resiliently deformed and generates the bending oscillations in the approximately same manner as the resilient member 144.

In this manner, the displacements similar to the displacements of the first beam portion 140 are generated in the second beam portion 141. FIG. 5 shows an example in which the displacements are generated in the oscillation body 124 in this manner.

In FIG. 5, a solid line indicates positions of the first beam portion 140, the second beam portion 141 and the reflection mirror 120 when a voltage is not applied to the first piezoelectric element 150 and the second piezoelectric element 152. Further, a broken line indicates positions of the first beam portion 140, the second beam portion 141 and the reflection mirror 120 when an AC voltage is applied to the first piezoelectric element 150 and the second piezoelectric element 152 at a certain voltage.

Here, the fourth piezoelectric element 153 is fixedly secured to the resilient member 147 of the second beam portion 141. When such bending oscillations as described above are generated in the resilient member 147, the bending oscillations are converted into a voltage by the fourth piezoelectric element 153 and a voltage signal corresponding to a twisting quantity of the second beam portion 141 is outputted from the output terminals 166, 167. Further, in the same manner, the third piezoelectric element 151 is fixedly secured to the resilient member 145 of the second beam portion 141. When such bending oscillations as described above are generated in the resilient member 145, the bending oscillations are converted into a voltage by the third piezoelectric element 151 and a voltage signal corresponding to a twisting quantity of the second beam portion 141 is outputted from the output terminals 162, 163. Here, a second piezoelectric element portion is constituted of the third piezoelectric element 151 and the fourth piezoelectric element 153.

With the use of the third piezoelectric element 151 and the fourth piezoelectric element 153 in this manner, the signal corresponding to the twisting quantity of the second beam portion 141 can be generated and hence, a light beam detector which detects the displacements of the reflection mirror becomes unnecessary whereby it is possible to miniaturize the device.

Here, the first beam portion 140, the second beam portion 141 and the reflection mirror 120 are oscillation bodies which are movable relative to the fixed frame portion 116 as described above and perform torsional resonance at an intrinsic resonance frequency using the oscillation axis Lr as a center axis.

Q (Quality Factor) of this resonance system amounts to several hundreds and hence, in applying the AC voltage to two driving piezoelectric elements, that is, the first driving piezoelectric element 150 and the second driving piezoelectric element 152, when a frequency of the AC voltage is changed and the changed frequency matches the resonance frequency of the oscillation body 124, amplitude of oscillations of the movable member including the reflection mirror 120 becomes extremely large.

Accordingly, when the movable member is oscillated at the resonance frequency in this manner, even when electricity supplied to the first piezoelectric element 150 and the second piezoelectric element 152 is small, it is possible to obtain displacements of the reflection mirror 120 which are usually unable to obtain and hence, power efficiency is extremely enhanced and, at the same time, it is possible to realize the miniaturization of the optical scanner 71.

However, the resonance frequency is changed based on temperature and humidity of an environment where the optical scanner is arranged and there also exists individual difference for every optical scanner 71. On the other hand, as described previously, Q of the resonance system is high, that is, several hundreds and hence, the resonance frequency falls within an extremely small limited range. Accordingly, in many cases, a driving frequency of horizontal scanning driving which oscillates the reflection mirror 120, that is, the horizontal scanning driving frequency often does not completely agree with the resonance frequency.

[3 Change of Resonance Frequency of Optical Scanner]

In conjunction with drawings, the explanation is made hereinafter with respect to a method of changing the resonance frequency of the optical scanner 71 having the above-mentioned constitution when the horizontal scanning frequency and the resonance frequency do not agree with each other as described above.

Figure 6A:
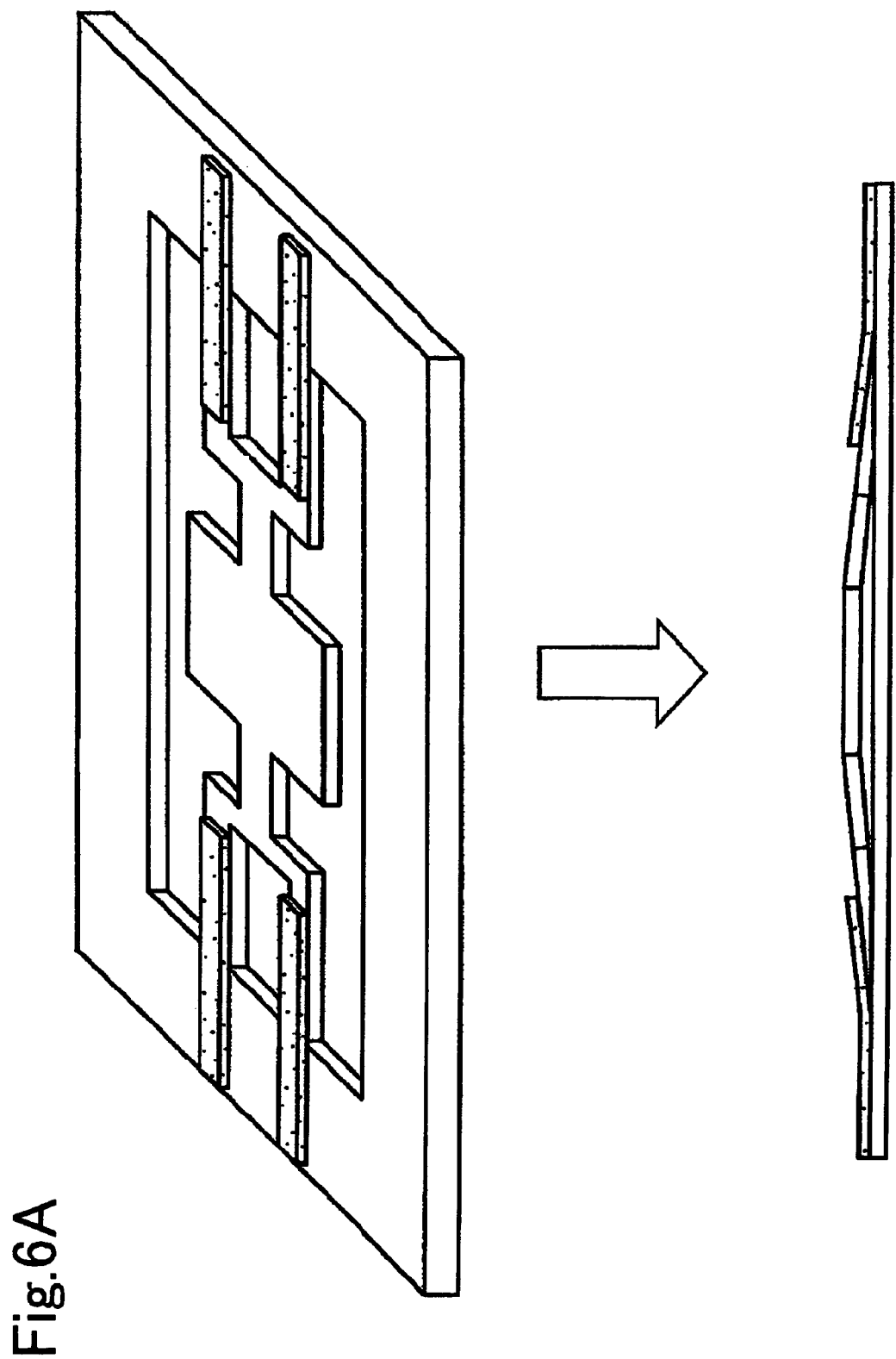
Figure 6C:
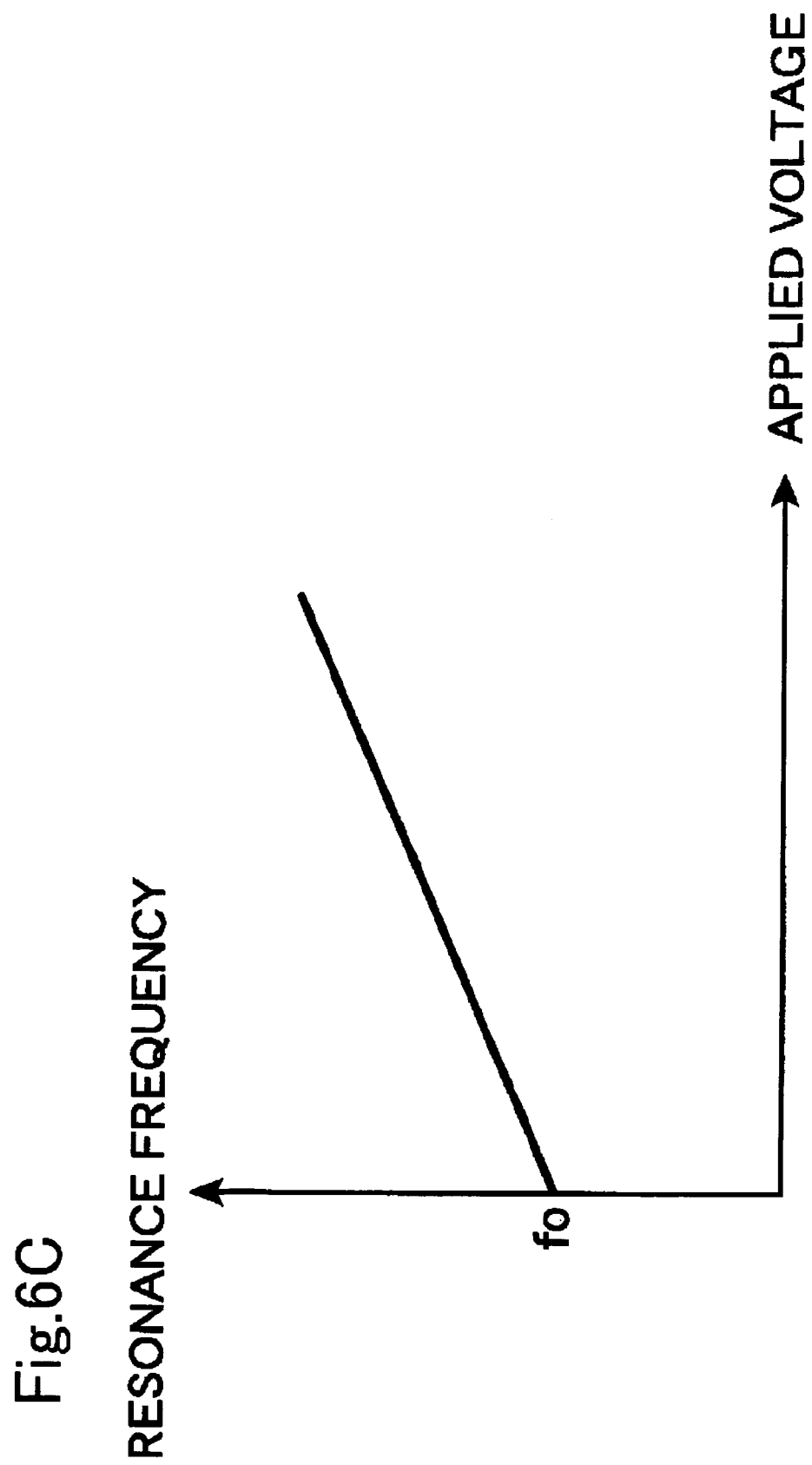

In image display device 1 of this embodiment, by applying DC voltage components to the piezoelectric element portions mounted on the oscillating body 124 of the optical scanner 71, a tension is applied to the first beam portion 140 and the second beam portion 141 so that the resonance frequency of the optical scanner 71 can be changed. FIG. 6A to FIG. 6C are views showing a principle of changing resonance frequency of the optical scanner 71 according to this embodiment.

FIG. 6A is a view showing a state of the oscillating body 124 of the optical scanner 71 when the same DC voltage components are applied to the first piezoelectric element 150 and the second piezoelectric element 152 in the optical scanner 71.

As shown in FIG. 6A, a tension is applied to the driving members of the optical scanner 71. When the driving member are in such a tension applied state, a force necessary for generating displacements of the driving members and a force necessary for restoring the driving members are increased and hence, an apparent spring constant is increased whereby the resonance frequency is changed. FIG. 6B is a view which schematically shows a displacement force or a restoring force when the tension applied to the driving members is high and the displacement force or the restoring force when the tension applied to the driving members is low. When the tension is high, both the displacement force and the restoring force are increased.

Further, the relationship between the DC voltage applied to the first piezoelectric element 150 and the second piezoelectric element 152 and the resonance frequency of the optical scanner 71 is set as shown in FIG. 6C. That is, the resonance frequency is increased along with the increase of the applied voltage. Further, the applied voltage may not always be formed of the DC voltage itself provided that the applied voltage is formed of the DC voltage components. For example, the voltage may be DC voltage components of the applied voltage formed by changing pulse waves synchronized with oscillations or a duty ratio (hereinafter, may also referred to as "DC voltage" including such DC voltage components). Here, similar advantageous effects can be obtained by such a method in which the DC voltage component is changed or the like.

Figure 7:
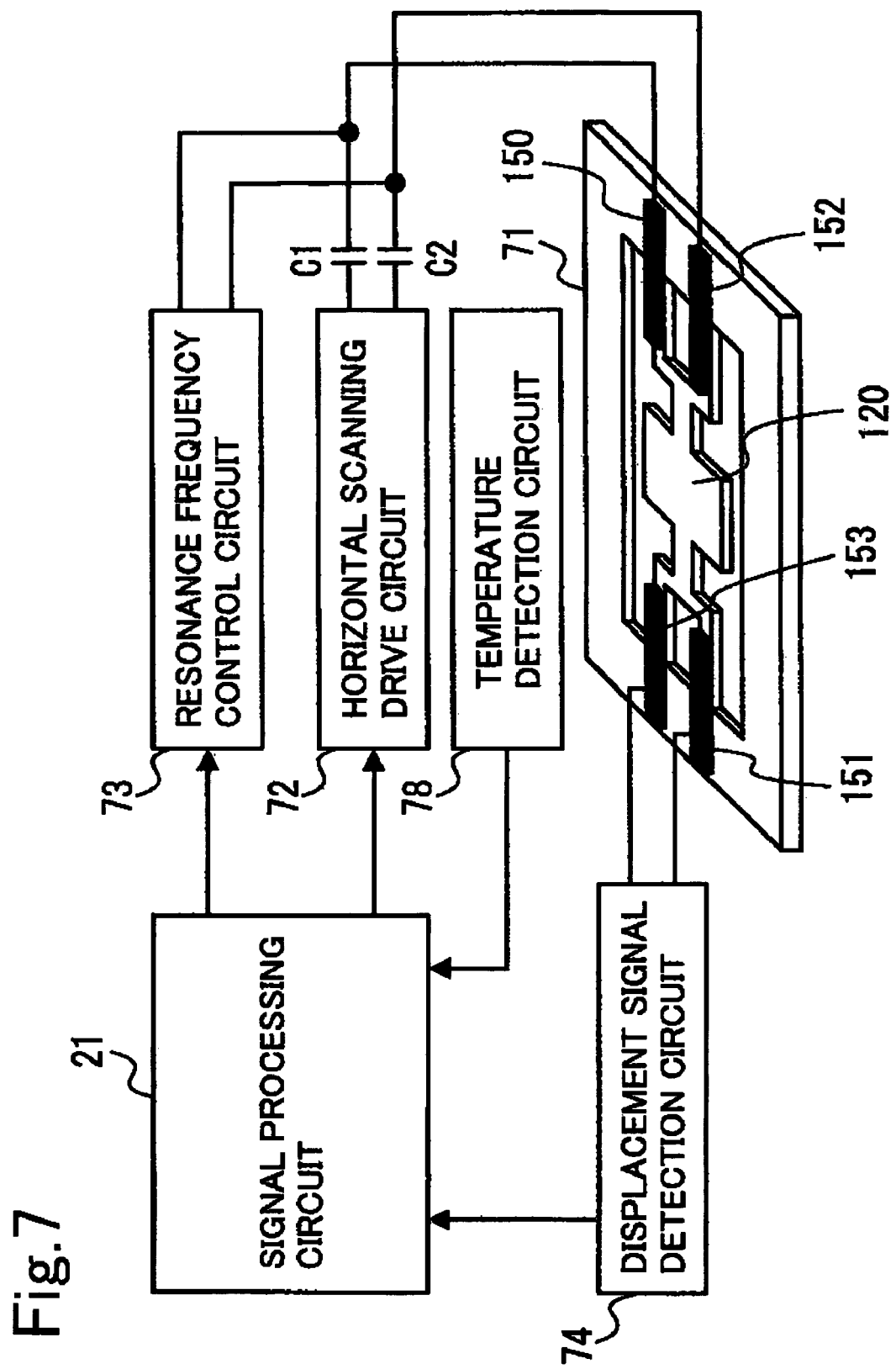
FIG. 7 is a view showing the constitution for changing the resonance frequency of the optical scanner.

FIG. 7 is a view showing the constitution for changing the resonance frequency of the optical scanner 71 of the image display device 1 according to the first embodiment.

As shown in FIG. 7, the constitution for changing the resonance frequency includes: a displacement signal detecting circuit 74 which detects the displacement of the optical scanner 71; the signal processing circuit 21 which constitutes a control means for outputting a signal corresponding to the displacement of the optical scanner 71; a resonance frequency control circuit 73 which generates a DC voltage for controlling the resonance frequency based on the signal outputted from the signal processing circuit 21; a horizontal scanning drive circuit 72 which outputs a horizontal scanning signal generated by a power source part which generates an AC voltage having a frequency and amplitude based on a horizontal synchronizing signal from the signal processing circuit 21 (hereinafter, referred to as "horizontal scanning signal") to the optical scanner 71; and capacitors C1, C2 for superposing the AC voltage outputted from the horizontal scanning drive circuit 72 on the DC voltage outputted from the resonance frequency control circuit 73. Further, as a temperature sensor which detects temperatures of the piezoelectric element portions of the optical scanner 71 or temperatures around the piezoelectric element portions, a temperature detecting circuit 78 is provided. Here, the horizontal scanning signal which the horizontal scanning drive circuit 72 outputs is formed of a first horizontal scanning signal and a second horizontal scanning signal which respectively assume phases opposite to each other. Further, the first horizontal scanning signal is outputted from a first output terminal of the horizontal scanning drive circuit 72, while the second horizontal scanning signal is outputted from a second output terminal of the horizontal scanning drive circuit 72. Here, the "power source part" is constituted of a power source part of the resonance frequency control circuit 73 described later and a power source part of the horizontal scanning drive circuit 72 also described later.

The displacement signal detecting circuit 74 is a circuit which detects the displacement generated in the reflection mirror 120 based on signals outputted from the third piezoelectric element 151 and the fourth piezoelectric element 153 (hereinafter, referred to as "output signals"). The displacement signal detecting circuit 74 detects an oscillation frequency (displacement frequency) and amplitude (displacement range) of the reflection mirror 120 based on these output signals. Here, the oscillation frequency of the reflection mirror 120 is detected based on a frequency of the output signal having a sinusoidal waveform, and the amplitude of the reflection mirror 120 is detected based on an amplitude level of a sinusoidal waveform of the output signal. In this manner, the displacement signal detecting circuit 74 functions as a reflection mirror displacement detector.

Further, the displacement signal detecting circuit 74 includes a memory part which prestores a table of correspondence between an amplitude level of the output signal and an actual amplitude level of the reflection mirror 120. Referring to the table of correspondence prestored in the memory part, the actual amplitude of the reflection mirror 120 is detected based on the amplitude level of the inputted output signal. In this manner, the displacement generated in the reflection mirror 120 can be detected based on the signals outputted from the third piezoelectric element 151 and the fourth piezoelectric element 153 as described above.

Here, the detection of the amplitude level of the reflection mirror 120 by the displacement signal detecting circuit 74 is not limited to the detection performed based on the table of correspondence stored in the memory part. Arithmetic operation information which can calculate the actual amplitude level of the reflection mirror 120 based on the amplitude level of the output signal may be stored in the memory part, and the amplitude of the reflection mirror 120 may be detected by performing the arithmetic operation based on the arithmetic operation information.

The signal processing circuit 21 outputs the horizontal synchronizing signal to the horizontal scanning drive circuit 72 for oscillating the optical scanner 71 based on the horizontal frequency for horizontal scanning.

Further, the signal processing circuit 21 detects deviation of the resonance frequency based on the oscillation frequency, the amplitude or the like of the reflection mirror 120 which is detected by the displacement signal detecting circuit 74, and outputs a signal corresponding to the detection result to the resonance frequency control circuit 73.

The resonance frequency control circuit 73 is a circuit which generates a DC voltage based on the signal from the signal processing circuit 21. The resonance frequency control circuit 73 includes a power source part which applies a DC voltage to the first piezoelectric element 150 from a first output terminal of the resonance frequency control circuit 73, and a power source part which applies a DC voltage to the second piezoelectric element 152 from a second output terminal of the resonance frequency control circuit 73. The same DC voltage is outputted to the first piezoelectric element 150 and the second piezoelectric element 152 from these power source parts. Here, the former power source part corresponds to the second power source part, and the latter power source part corresponds to the third power source part. Further, the second power source part can also output a DC voltage to the third piezoelectric element 151, and the third power source part can also output a DC voltage to the fourth piezoelectric element 153. Further, the second power source part and the third power source part are also capable of supplying different DC voltages from each other.

Here, the first output terminal of the horizontal scanning drive circuit 72 is connected to the first output terminal of the resonance frequency control circuit 73 via the capacitor C1. In the same manner, the second output terminal of the horizontal scanning drive circuit 72 is connected to the second output terminal of the resonance frequency control circuit 73 via the capacitor C2. Due to such a constitution, voltages which are inputted to the first piezoelectric element 150 and the second piezoelectric element 152 are voltages obtained by superposing the horizontal scanning signals from the horizontal scanning drive circuit 72 on the DC voltage outputted from the resonance frequency control circuit 73.

Here, in the image display device 1 according to the first embodiment, the horizontal scanning signals from the horizontal scanning drive circuit 72 are superposed on the DC voltage outputted from the resonance frequency control circuit 73, and are inputted to the first piezoelectric element 150 and the second piezoelectric element 152. However, it is not always necessary to adopt such a constitution.

Figure 9:
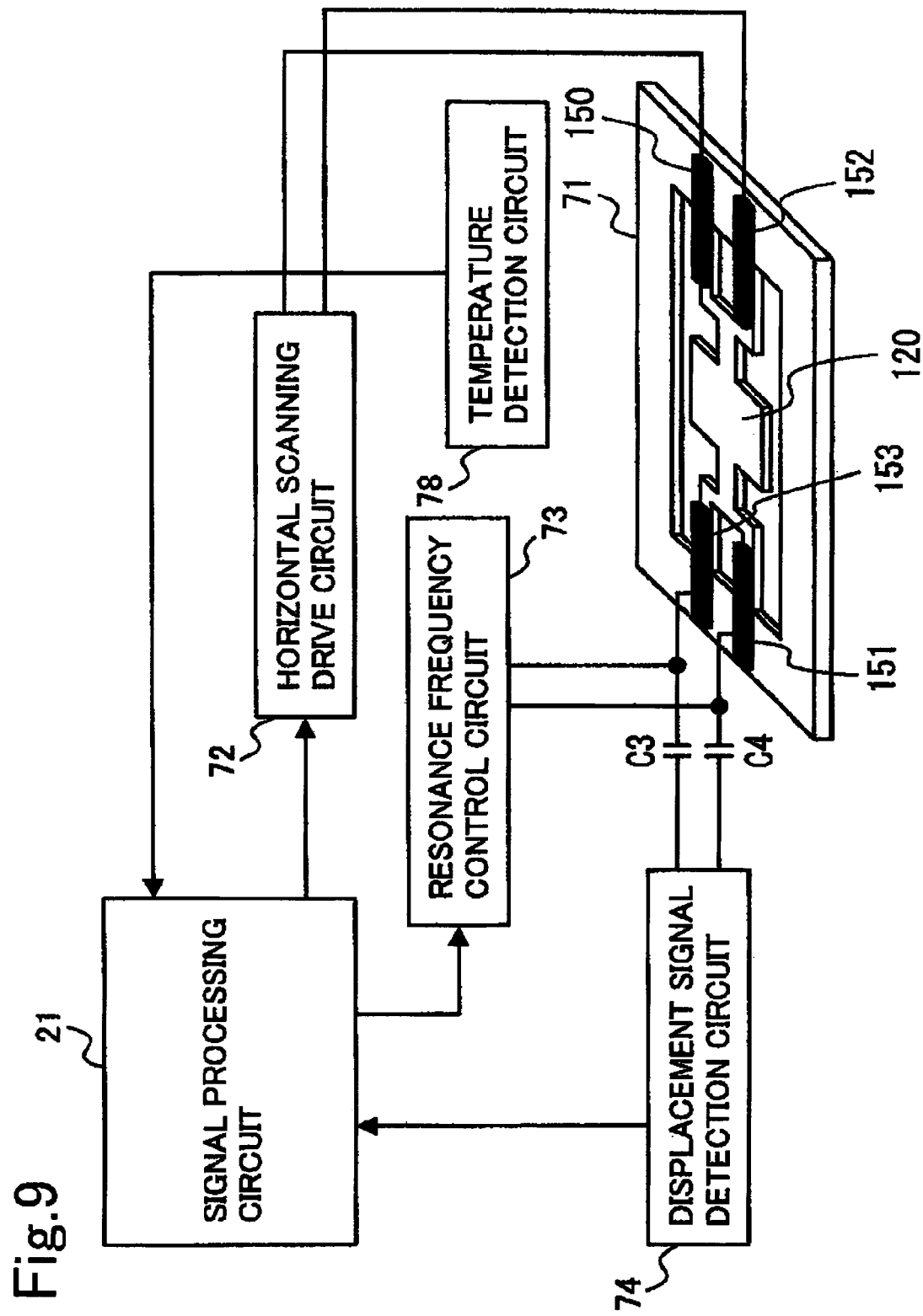
FIG. 9 is a view showing another constitution of the optical scanner for changing the resonance frequency.

For example, as shown in FIG. 9, the horizontal scanning signals from the horizontal scanning drive circuit 72 may be inputted to the first piezoelectric element 150 and the second piezoelectric element 152 with phases opposite to each other and, at the same time, the DC voltage outputted from the resonance frequency control circuit 73 is inputted to the third piezoelectric element 151 and the fourth piezoelectric element 153. In this case, the displacement signal detecting circuit 74 is, as shown in FIG. 9, connected to respective electrodes of the third piezoelectric element 151 and the fourth piezoelectric element 153 via the capacitors C3, C4.

Figure 8:
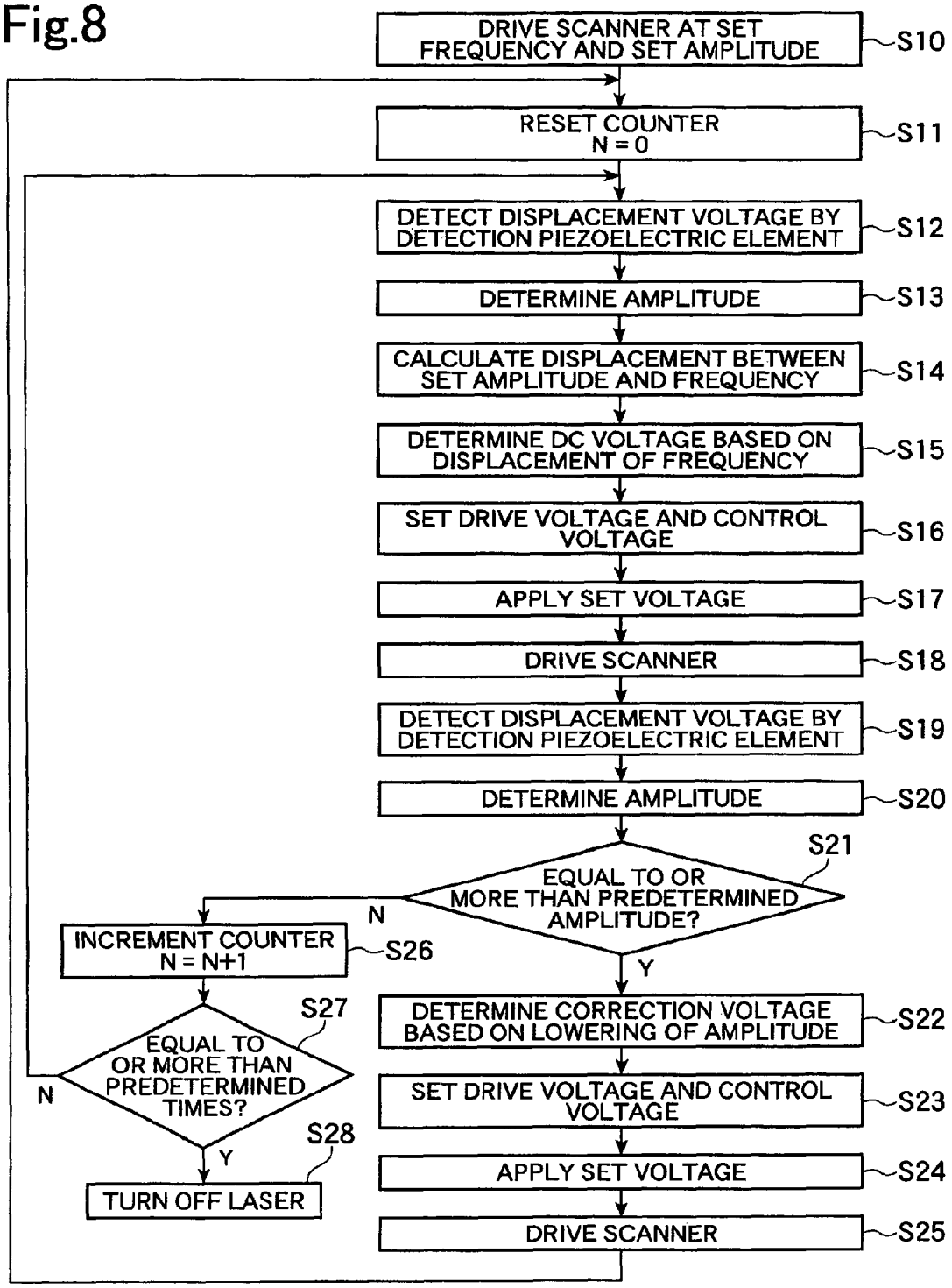
FIG. 8 is a control flowchart for changing a resonance frequency of the optical scanner.

With respect to the image display device 1 having the above-described constitution, a resonance frequency change control of the optical scanner 71 is specifically explained in conjunction with a flowchart shown in FIG. 8. FIG. 8 shows a resonance frequency change operation flow of the optical scanner 71 of the image display device 1 shown in FIG. 7.

First of all, in the image display device 1, for projecting an image on the retina 14 of the viewer, the luminous flux whose intensity is modulated based on the video signal S supplied from the outside is generated by the luminous flux generator 20 and the luminous flux generated in this manner is scanned in the horizontal direction using the horizontal scanning part 70 and, at the same time, is scanned in the vertical direction using the vertical scanning part 80.

In scanning the luminous flux in the horizontal direction using the horizontal scanning part 70 in this manner, the signal processing circuit 21 takes out predetermined frequency information on an initial value stored in a memory part of the signal processing circuit 21 and predetermined amplitude information on the initial value also stored in the memory part of the signal processing circuit 21 and outputs signals based on these information to the horizontal scanning drive circuit 72. The horizontal scanning drive circuit 72 generates a first horizontal scanning signal based on the signal from the signal processing circuit 21 and outputs the first horizontal scanning signal to the first piezoelectric element 150 and, at the same time, generates a second horizontal scanning signal having a phase opposite to a phase of the first horizontal scanning signal and outputs the second horizontal scanning signal to the second piezoelectric element 152 (step S10).

When the reflection mirror 120 starts the oscillations at the horizontal scanning frequency based on the horizontal scanning signal which is outputted from the horizontal scanning drive circuit 72, the output signals corresponding to the oscillations of the third piezoelectric element 151 and the fourth piezoelectric element 153 are inputted to the displacement signal detecting circuit 74 from the third piezoelectric element 151 and the fourth piezoelectric element 153 respectively. Further, a counterpart (not shown in the drawing) is reset to set a counter value of the counter part to 0 (N=0) (step S11).

The displacement signal detecting circuit 74, by referencing the table of correspondence based on the amplitudes of the output signals, detects the amplitude of the reflection mirror 120 (step S12) and informs the detected result to the signal processing circuit 21 (step S13).

Subsequently, based on the amplitude of the reflection mirror 120 which is informed from the displacement signal detecting circuit 74, the signal processing circuit 21 detects a deviation between the predetermined frequency and the resonance frequency. The deviation between the predetermined frequency and the resonance frequency is determined based on whether the amplitude of the reflection mirror 120 informed from the displacement signal detecting circuit 74 exceeds the amplitude level corresponding to the predetermined frequency or not. When the amplitude of the reflection mirror 120 does not exceed this amplitude level, it is determined that the frequency is deviated (step S14).

When the signal processing circuit 21 determines that the frequency is deviated, based on the amplitude of the reflection mirror 120 which is informed from the displacement signal detecting circuit 74 last time (hereinafter, referred to as "amplitude of last time") and the amplitude of the reflection mirror 120 which is informed this time (hereinafter, referred to as "amplitude of this time"), the signal processing circuit 21 determines the DC voltage components to be outputted to the resonance frequency control circuit 73 (step S15).

That is, when the signal processing circuit 21 determines that the frequency is deviated, the signal processing circuit 21 compares the amplitude of last time and the amplitude of this time and determines such a DC voltage which allows the amplitude of this time to approximate the amplitude corresponding to the oscillation frequency of the reflection mirror 120.

When there is no amplitude of last time, that is, at the time of detecting the frequency deviation of the first time, the signal processing circuit 21 determines the DC voltage based on only the amplitude of this time.

The signal generated in the step S15 is inputted and set in the resonance frequency control circuit 73 (step S16). The resonance frequency control circuit 73 and the horizontal scanning drive circuit 72 respectively apply the DC voltage and the AC voltage based on the predetermined signals to the optical scanner 71 (step S17). In accordance with the DC voltage and the AC voltage which are applied in this manner, the optical scanner 71 is driven (step S18).

Further, the output signals corresponding to the oscillations of the third piezoelectric element 151 and the fourth piezoelectric element 153 are inputted to the displacement signal detecting circuit 74 from the third piezoelectric element 151 and the fourth piezoelectric element 153 respectively. The displacement signal detecting circuit 74, by referring to the table of correspondence based on the amplitude of the output signals, detects the amplitude of the reflection mirror 120 (step S19) and informs the detected result to the signal processing circuit 21 (step S20).

Subsequently, the signal processing circuit 21 determines whether the amplitude of the reflection mirror 120 informed from the displacement signal detecting circuit 74 in step S20 is equal to or more than the predetermined amplitude level which corresponds to the set frequency (step S21). When it is determined that the amplitude of the reflection mirror 120 is equal to or more than the predetermined amplitude level (step S21: Y), the signal processing circuit 21 determines whether the amplitude of the reflection mirror 120 satisfies the set amplitude or not. When the amplitude of the reflection mirror 120 does not satisfy the set amplitude, the signal processing circuit 21 determines a correction voltage which satisfies the set amplitude (step S22).

The signal processing circuit 21 inputs and sets the correction voltage which is determined in step S22 in the horizontal scanning drive circuit 72 (step S23). The resonance frequency control circuit 73 and the horizontal scanning drive circuit 72 respectively apply the DC voltage and the AC voltage based on the set signals to the optical scanner 71 (step S24). In accordance with the DC voltage and the AC voltage which are applied in this manner, the optical scanner 71 is driven (step S25).

When the step S25 is finished, controls ranging from the step S11 to the step S27 are repeatedly performed. Here, after making the resonance frequency of the optical scanner 71 match the horizontal scanning frequency, these controls may be halted or stopped for a predetermined period. Due to such processing, it is possible to reduce a load imposed on the signal processing circuit 21.

Further, in step S21, when it is determined that the amplitude of the reflection mirror 120 is smaller than the predetermined amplitude level (step S21: N), the signal processing circuit 21 increments a counter value of the counterpart (N=N+1) (step S26). Next, the signal processing circuit 21 determines whether the counter value of the counter part becomes equal to or more than a predetermined value or not (step S27). When it is determined that the counter value becomes equal to or more than the predetermined value (step S27: Y), the oscillations of the optical scanner 71 are stopped and, at the same time, the generation of the respective video signals 22a to 22c is stopped (step S28). Further, in the step S27, when it is determined that the counter value of the counter part is not equal to or more than the predetermined value, the controls ranging from the step S12 are repeated.

As has been described heretofore, in the image display device 1 according to this embodiment, the deviation between the resonance frequency of the optical scanner 71 and the horizontal scanning frequency is detected and the DC voltage components are applied to the first piezoelectric element 150 and the second piezoelectric element 152 based on the detected result. Accordingly, it is possible to make the resonance frequency of the optical scanner 71 match the horizontal scanning frequency. Further, by continuously performing the processing ranging from step S11 to step S27 while projecting the image on the retina 14 of the viewer, it is possible to ensure a stable scanning angle.

Processing in step S14 may also be executed as follows. It is determined in a predicting manner whether the resonance frequency deviation is a deviation toward low frequency or toward high frequency with respect to the oscillation frequency based on a temperature detected by the temperature detecting circuit 78, and the DC voltage is applied to the first piezoelectric element 150 and the second piezoelectric element 152 based on the determination.

For example, when the detected temperature is higher than a reference temperature, it is determined that the resonance frequency deviation is a deviation toward the high frequency side. On the other hand, when the detected temperature is lower than the reference temperature, it is determined that the resonance frequency deviation is a deviation toward the low frequency side. Here, the processing may also be executed such that the DC voltage to be applied to the resonance frequency control circuit 73 is determined based on the determination result, and the amplitude level of the reflection mirror 120 informed from the displacement signal detecting circuit 74.

Second Embodiment

Figure 10:
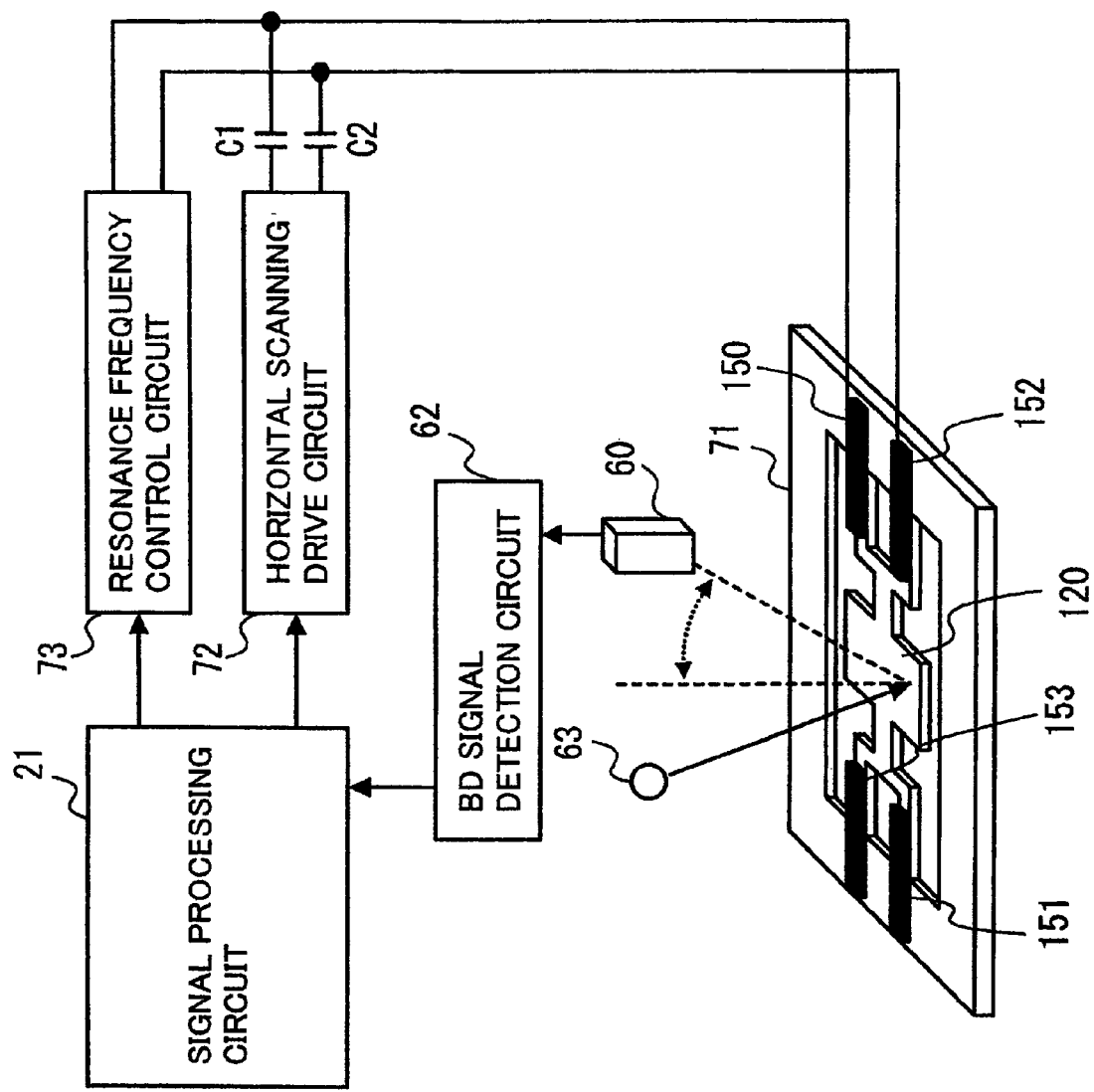
FIG. 10 is a view showing still another constitution of the optical scanner for changing the resonance frequency.

FIG. 10 shows a second embodiment of the image display device 1 to which the present invention is applied. The constitution which makes the second embodiment differ from the first embodiment lies in that the displacement of the optical scanner 71 (oscillation frequency of the oscillation body 124 and amplitude thereof) is not detected using the third and fourth piezoelectric elements 151, 153, but is detected using a light beam detector 60. Other parts of this embodiment are equal to the corresponding parts of the first embodiment.

As shown in FIG. 10, the image display device 1 according to the second embodiment includes a light beam detector 60. The light beam detector 60 is arranged at a position where the light beam detector 60 can receive a reflection light of a luminous flux which is incident on a reflection mirror 120 from a test light source 63 when the reflection mirror 120 is arranged at a predetermined position. The light beam detector 60 outputs a High level signal during a period in which the light beam detector receives the reflection light. In the second embodiment, when the reflection mirror 120 is rotated in the clockwise direction by 10 degrees, the light beam detector 60 is arranged at a position where the light beam detector 60 can receive the reflection light of the luminous flux. However, it is needless to say that this embodiment is not limited to such a constitution.

Further, the image display device 1 according to the second embodiment includes a light beam detector (BD) signal detecting circuit 62 which detects an oscillation frequency and amplitude of the reflection mirror 120 based on an output signal from the light beam detector 60. In a state that the reflection mirror 120 is oscillated, High signal pulses are sequentially outputted from the light beam detector 60, and the BD signal detecting circuit detects the amplitude of the reflection mirror 120 based on an interval between the pulses (time difference between an outgoing path and an incoming path of the reflection mirror). Other constitutional elements of the second embodiment are as same as the constitutional elements of the first embodiment.

Figure 11:
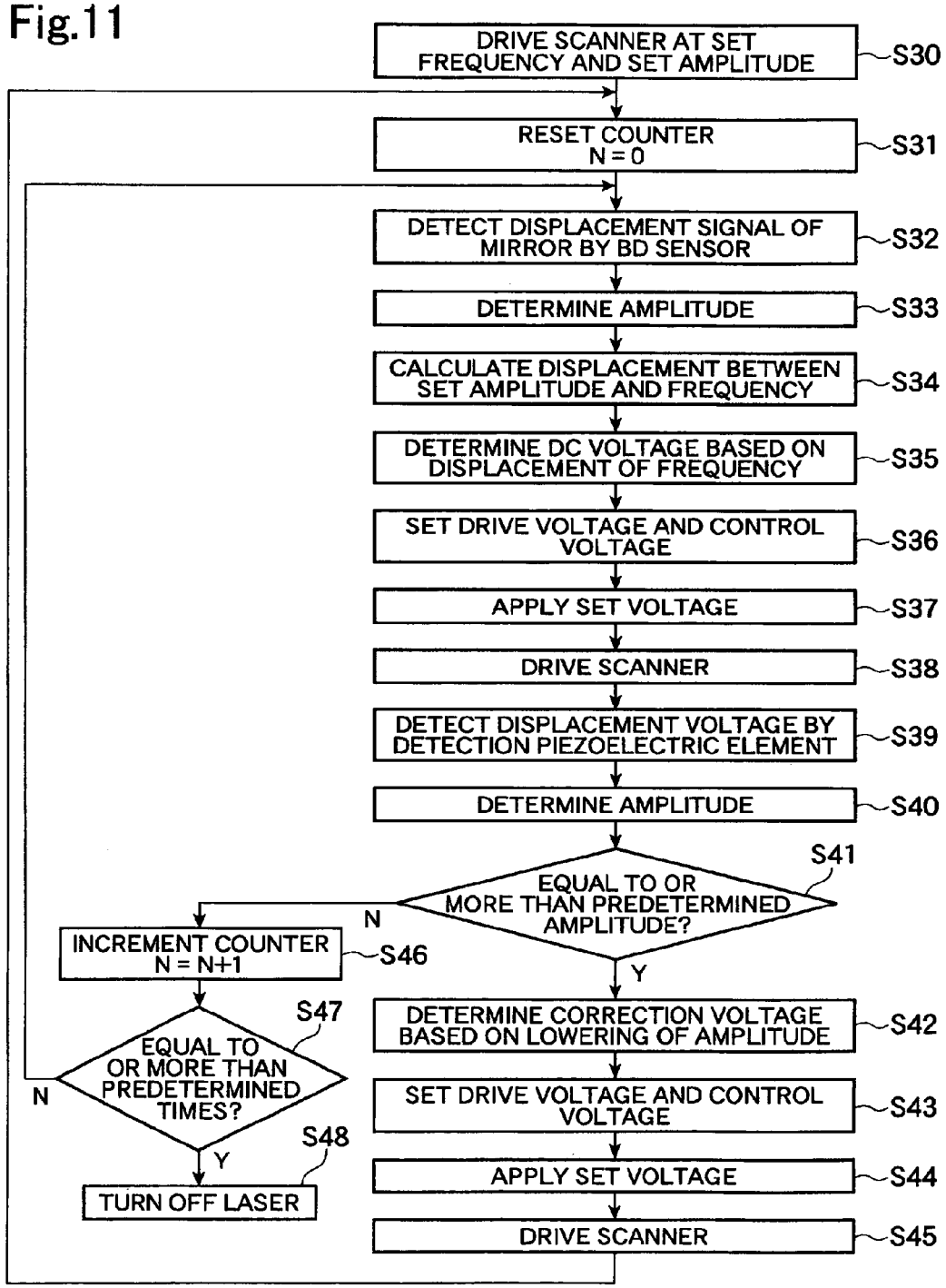
FIG. 11 is another control flowchart for changing a resonance frequency of the optical scanner.

A resonance frequency change operation of the optical scanner 71 in the image display device 1 having such a constitution is explained in conjunction with FIG. 11. Here, out of steps shown in FIG. 11, respective steps S30, S31, S33 to S48 are substantially as the same as steps S10, S11, S13 to S28 shown in FIG. 8 which are explained in conjunction with the first embodiment and hence, the explanation of these steps is omitted, and only step S32 is explained.

In step S32, the amplitude of the reflection mirror 120 is detected based on an interval between the pulses which are sequentially outputted from the light beam detector 60 (time difference between the ongoing and the incoming path of the reflection mirror 120).

Figure 12:
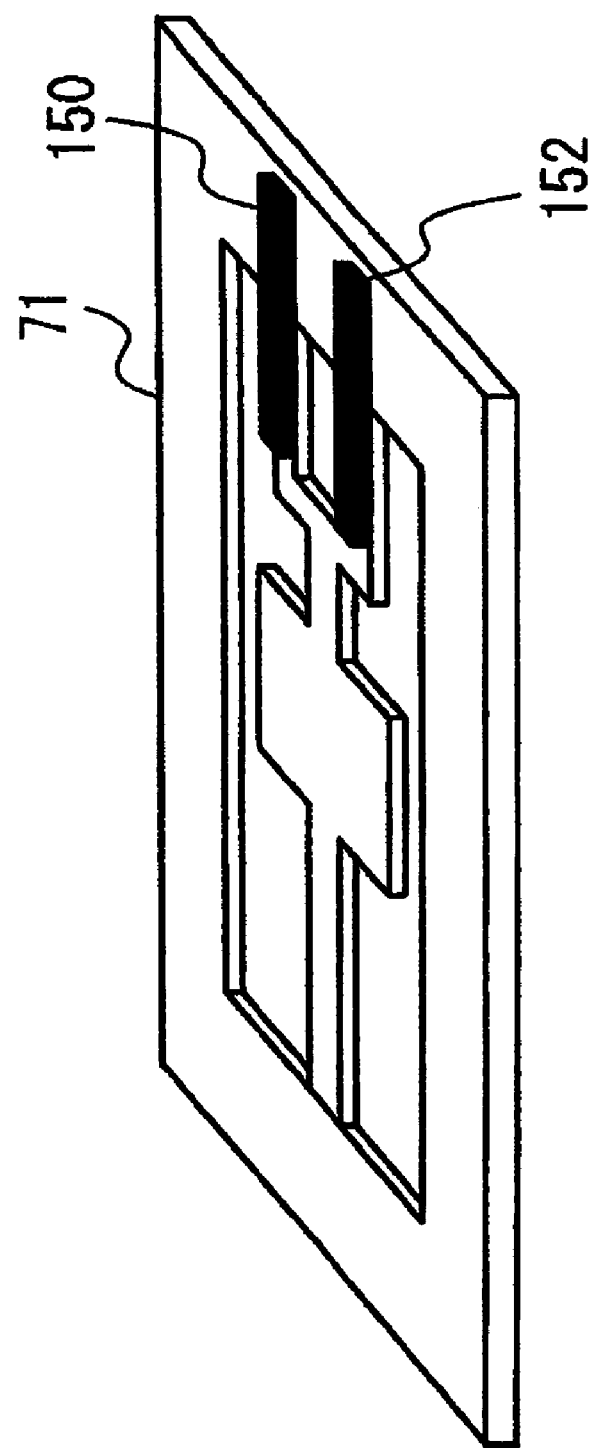
FIG. 12 is a view showing another constitution of the optical scanner.

In this manner, the amplitude of the reflection mirror 120 can be detected by making use of the light beam detector 60 and hence, the second beam portion 141 is constituted of one resilient member as shown in FIG. 12. Further, even when the optical scanner includes no piezoelectric elements, it is possible to change the resonance frequency.

Third Embodiment

Figure 13:
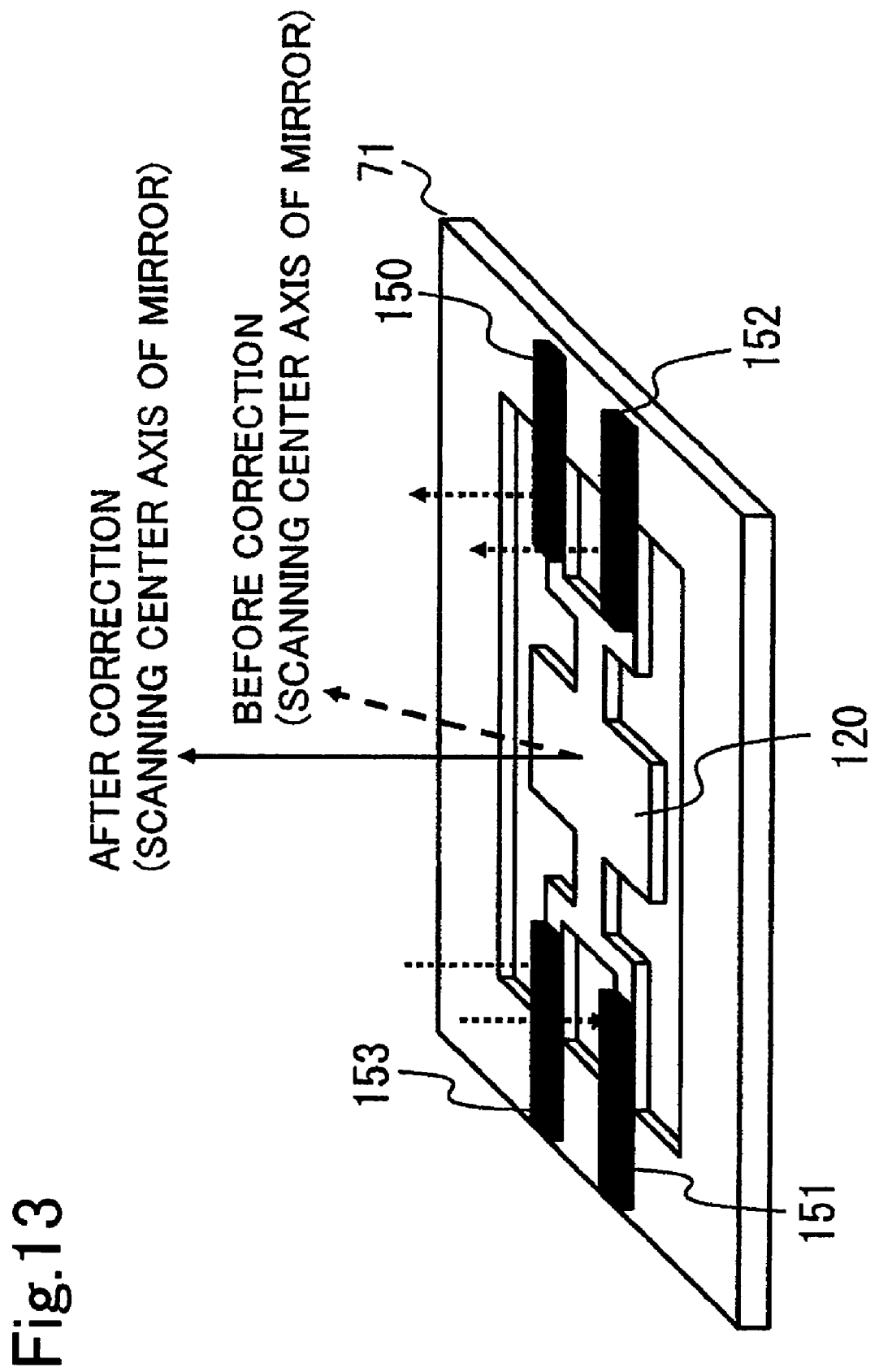
FIG. 13 is a view showing a principle of correcting the inclination of a reflection mirror of the optical scanner.

In this embodiment, in an image display device 1, DC voltage components are applied to two piezoelectric element portions formed on an oscillation body 124 of an optical scanner 71 so as to apply different tensions to the first beam portion 140 and the second beam portion 141 thus correcting the inclination of a reflection mirror 120 in the optical scanner 71. FIG. 13 is a view showing a concept of inclination correction of the reflection mirror 120 in the optical scanner 71 according to this embodiment.

FIG. 13 shows a state in which a negative DC voltage is applied to the first piezoelectric element 150 and the second piezoelectric element 152 so as to bend the first piezoelectric element 150 and the second piezoelectric element 152 upwardly, while a positive DC voltage is applied to the third piezoelectric element 151 and the fourth piezoelectric element 153 so as to bend the third piezoelectric element 151 and the fourth piezoelectric element 153 downwardly. By applying the DC voltages in this manner, it is possible to incline the reflection mirror 120 in the leftward direction. Accordingly, even when the reflection mirror 120 is inclined in the rightward direction, by applying the voltages in this manner, it is possible to perform a correction control so as to eliminate the inclination of the reflection mirror 120.

Further, in the same manner, when the reflection mirror 120 is inclined in the rightward direction, the positive DC voltage is applied to the first piezoelectric element 150 and the second piezoelectric element 152 so as to bend the first piezoelectric element 150 and the second piezoelectric element 152 downwardly, while the negative DC voltage is applied to the third piezoelectric element 151 and the fourth piezoelectric element 153 so as to bend the third piezoelectric element 151 and the fourth piezoelectric element 153 upwardly and hence, the correction control can be performed so as to eliminate the inclination of the reflection mirror 120.

On the other hand, when the reflection mirror 120 is inclined frontwardly, the positive DC voltage is applied to the first piezoelectric element 150 and the fourth piezoelectric element 153 so as to bend the first piezoelectric element 150 and the fourth piezoelectric element 153 downwardly, while the negative DC voltage is applied to the second piezoelectric element 152 and the third piezoelectric element 151 so as to bend the second piezoelectric element 152 and the third piezoelectric element 151 upwardly and hence, the correction control is performed so as to eliminate the inclination of the reflection mirror 120. When the reflection mirror 120 is inclined rearwardly, DC voltages having reversed polarity are applied to the piezoelectric elements.

In this manner, even when the reflection mirror 120 is displaced in any direction out of frontward, rearward, leftward and rightward directions, it is possible to correct the position of the reflection mirror 120 to the normal position in accordance with the polarities of the voltage and the voltage levels to be applied to the first piezoelectric element 150, the second piezoelectric element 152, the third piezoelectric element 151 and the fourth piezoelectric element 153.

Figure 14:
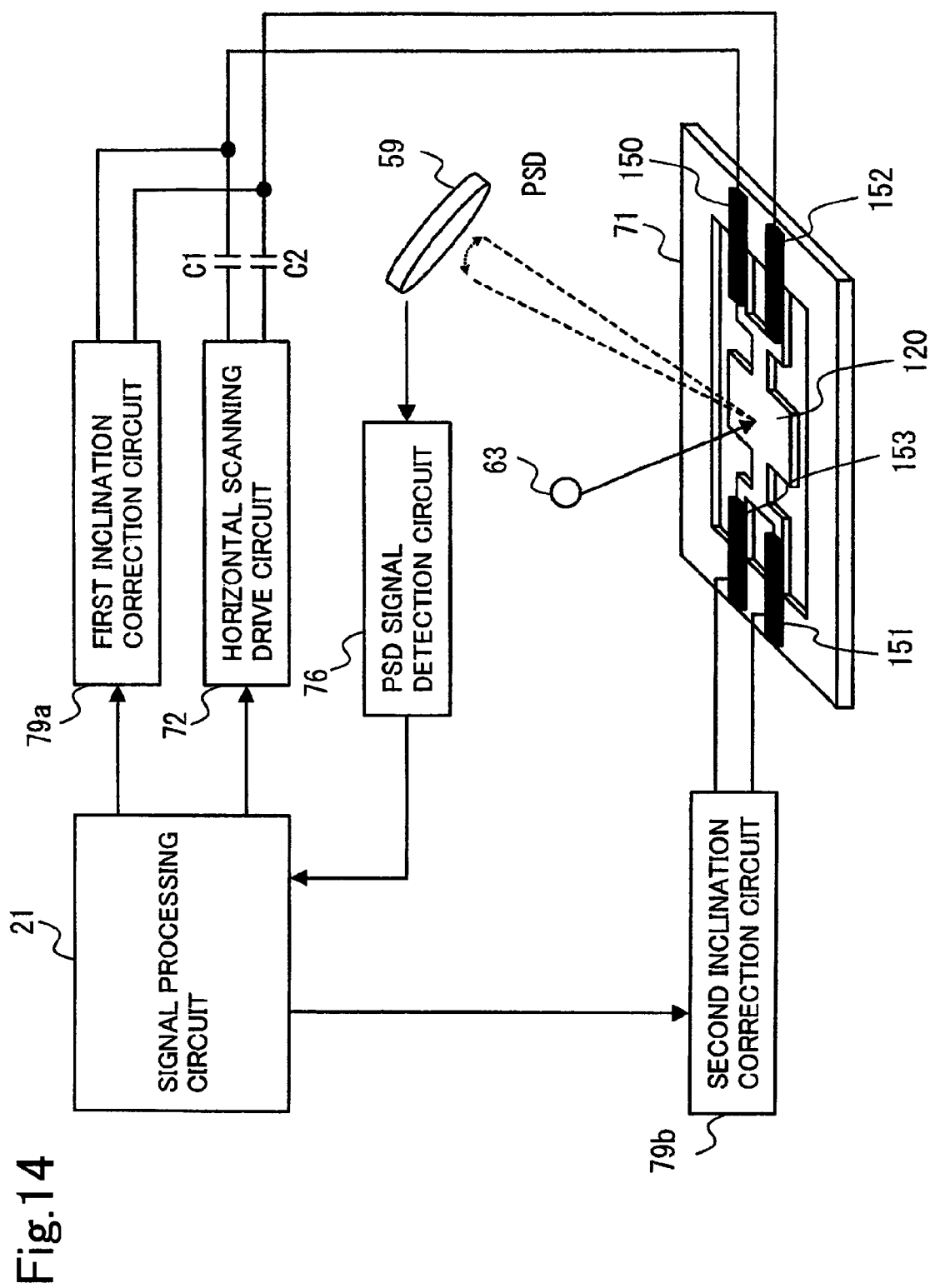
FIG. 14 is a view showing the constitution for correcting the inclination of the reflection mirror of the optical scanner.

FIG. 14 is a view showing the constitution for correcting the inclination of the reflection mirror 120 in the optical scanner 71 of the image display device 1 in the first embodiment.

As shown in FIG. 14, the constitution for correcting the inclination of the reflection mirror 120a includes a position sensitive detector (hereinafter, referred to as "PSD") 59 which is arranged at a position where the PSD 59 can receive the reflection light of the laser beams incident on the reflection mirror 120 from the test light source 63 and has a plurality of light-receiving portions thereof mounted two-dimensionally, a PSD signal detecting circuit 76 which detects the inclination of the reflection mirror 120 based on a signal outputted from the PSD 59, a first and a second inclination correction circuits 79a, 79b which respectively include a power source part generating a DC voltage for correcting the inclination of the reflection mirror 120, the signal processing circuit 21 which constitutes a control unit for outputting a control signal corresponding to the inclination of the optical scanner 71, the horizontal scanning drive circuit 72, and the capacitors C1, C2. In this embodiment, the inclination correction circuit is divided into the first and the second inclination correction circuits 79a, 79b. However, the inclination correction circuit is not limited to such a constitution, and it is needless to say that the inclination correction circuit may be constituted of one inclination correction circuit. Further, a mirror position detector is constituted of the test light source 63 and the PSD signal detecting circuit 76.

The PSD signal detecting circuit 76 is configured to detect the inclination of the reflection mirror 120 based on a signal outputted from the PSD 59 (hereinafter, referred to as "PSD signal"). The PSD signal is a signal which indicates a light receiving portion of the PSD 59 at which the reflection light is detected, and the PSD signal detecting circuit 76 detects the inclination of the reflection mirror 120 based on the PSD signal.

In this manner, the detection of the inclination of the reflection mirror 120 is performed by detecting the position of a reflection mirror 120 when a voltage is not applied to the first to fourth piezoelectric elements 150 to 153 (hereinafter, referred to as "reference position") To be more specific, when the reflection mirror 120 is arranged at the reference position, an inclination position of the reflection mirror 120 is detected based on a distance between the light receiving portion which receives the reflection light from the test light source 63 and a reference light receiving portion. When the distance between the light receiving portion and the reference light receiving portion is 0, it is detected that the reflection mirror 120 is not inclined. Here, the detection of inclination may be performed such that the optical scanner is driven, the reflection mirror 120 is oscillated, and the scanning direction is calculated in the PSD signal detecting circuit 76 so as to detect the difference between the center of the scanning direction and a reference line.

The signal processing circuit 21 outputs, for oscillating the optical scanner 71 at a horizontal frequency for horizontal scanning, a signal for oscillating the optical scanner 71 to the horizontal scanning drive circuit 72 at the horizontal frequency.

Further, the signal processing circuit 21 outputs a signal for requesting the application of a DC voltage corresponding to the inclination of the reflection mirror 120 which is detected by the PSD signal detecting circuit 76 to the first and second inclination correction circuits 79a, 79b.

The first inclination correction circuit 79a is a circuit which includes a power source part provided for generating a DC voltage based on a signal from the signal processing circuit 21 and outputs the DC voltage to the first piezoelectric element 150 and the second piezoelectric element 152. Further, the second inclination correction circuit 79b is a circuit which includes a power source part for generating a DC voltage based on a signal from the signal processing circuit 21 and outputs the DC voltage to the third piezoelectric element 151 and the fourth piezoelectric element 153.

Here, a first output terminal of the horizontal scanning drive circuit 72 is connected to a first output terminal of the first inclination correction circuit 79a via a capacitor C1 and, in the same manner, a second output terminal of the horizontal scanning drive circuit 72 is connected to a second output terminal of the first inclination correction circuit 79a via the capacitor C2. Due to such a constitution, the voltage which is inputted to the first piezoelectric element 150 and the second piezoelectric element 152 becomes a voltage formed by superposing the horizontal scanning signal from the horizontal scanning drive circuit 72 on the DC voltage outputted from the first inclination correction circuit 79a.

Figure 15:
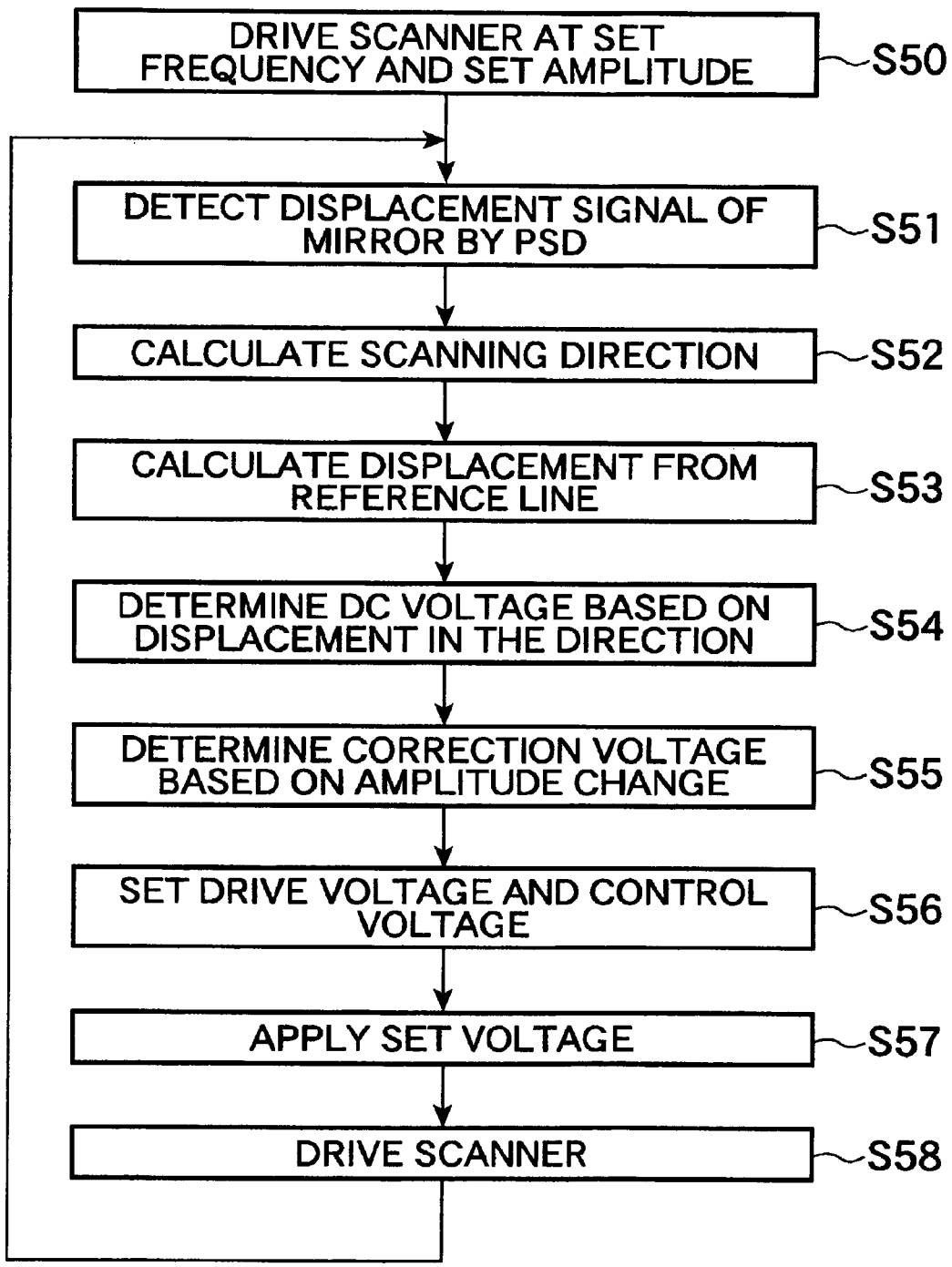
FIG. 15 is a control flowchart for correcting the inclination of the reflection mirror of the optical scanner.

In the image display device 1 having such a constitution, the inclination correction of the reflection mirror 120 of the optical scanner 71 is specifically explained in conjunction with a flowchart shown in FIG. 15 hereinafter. FIG. 15 shows a reflection mirror inclination correction operation flow of the optical scanner 71 of the image display device 1 shown in FIG. 14.

First of all, in the image display device 1, for projecting an image on the retina 14 of the viewer, a luminous flux whose intensity is modulated based on the image signal S which is supplied from the outside is generated by the luminous flux generator 20, and the luminous flux generated in this manner is scanned in the horizontal direction using the horizontal scanning part 70 and, at the same time, is scanned in the vertical direction using the vertical scanning part 80.

In scanning the luminous flux in the horizontal direction using the horizontal scanning part 70 in this manner, the signal processing circuit 21 takes out the predetermined frequency information of an initial value stored in a memory part of the signal processing circuit 21 and the predetermined amplitude information of an initial value also stored in the memory part of the signal processing circuit 21, and outputs signals based on the information to the horizontal scanning drive circuit 72. The horizontal scanning drive circuit 72 generates a first horizontal scanning signal having a frequency and amplitude based on the signal from the signal processing circuit 21 and outputs the first horizontal scanning signal to the first piezoelectric element 150 and, at the same time, generates a second horizontal scanning signal having a phase opposite to a phase of the first horizontal scanning signal and outputs the second horizontal scanning signal to the second piezoelectric element 152 thus driving the optical scanner (step S50).

When the reflection mirror 120 starts oscillations at the horizontal scanning frequency based on the horizontal scanning signal outputted from the horizontal scanning drive circuit 72, the PSD 59 sequentially detects the light receiving portion at which the reflection light from the test light source 63 is received and outputs the detection result as a PSD signal to the signal processing circuit 21 (step S51).

The signal processing circuit 21 calculates the scanning direction of the reflection mirror 120 based on the PSD signal (step S52) and, detects the deviation of the reflection mirror 120 with respect to the reference line based on the computation result (step S53). Here, the deviation of the reflection mirror 120 with respect to the reference line is synonymous with the inclination of the reflection mirror with respect to the reference position.

The signal processing circuit 21 determines a DC voltage to be applied corresponding to the detected direction deviation and the piezoelectric element (step S54). For example, when the reflection mirror 120 is frontwardly inclined at a certain angle, a positive DC voltage is applied to the first piezoelectric element 150 and the fourth piezoelectric element 153 by a voltage level corresponding to the inclination, while a negative DC voltage is applied to the second piezoelectric element 152 and the third piezoelectric element 151 by a voltage level corresponding to the inclination.

Further, when there exists a change in amplitude of the detected reflection mirror 120, the signal processing circuit 21 determines a correction AC voltage for adjusting the amplitude of the reflection mirror 120 (step S55). Here, the DC voltage determined in step S54 and the correction AC voltage determined in step S55 are inputted and set in the first and second inclination correction circuits 79a, 79b and the horizontal scanning drive circuit 72 (step S56).

Subsequently, the DC voltage and the AC voltage which are set in this manner are applied to the piezoelectric elements (step S57), and the optical scanner 71 is driven by the DC voltage and the AC voltage (step S58).

When step S58 is finished, controls from step S51 to step S58 are repeatedly performed.

As has been explained heretofore, in the image display device 1 according to this embodiment, the inclination of the reflection mirror 120 of the optical scanner 71 can be corrected by detecting the inclination of the reflection mirror 120 of the optical scanner 71 and, thereafter, by applying the DC voltage component to the first piezoelectric element 150, the second piezoelectric element 152, the third piezoelectric element 151 and the fourth piezoelectric element 153 based on the detection result. Further, by continuously performing the operations ranging from step S51 to S58 while the image is projected on the retina 14 of the viewer, it is possible to continuously correct the inclination of the reflection mirror 120.

Although the several embodiments of the present invention have been explained in detail in conjunction with the drawings heretofore, these embodiments are provided for an exemplary purpose, and the present invention can be exercised in other modes to which various modifications and improvements are applied based on knowledge of those who are skilled in the art including the modes described in the Disclosure of the Invention. For example, it is needless to say that the optical scan device to which the present invention is applied is also applicable to an optical scan device which scans a luminous flux inside a laser printer.

Further, although the inclination correction of the reflection mirror 120 is performed while the optical scanner 71 is driven, it is needless to say that it may be configured such that, in a state that the optical scanner 71 is not operated, the inclination of the reflection mirror 120 is detected and, based on the detection result, the inclination correction of the reflection mirror 120 is performed.

Further, although the third embodiment has been explained separately from the first embodiment and the second embodiment, the image display device 1 may carry out both of the resonance frequency deviation adjustment and the inclination correction of the reflection mirror. In such a case, it is possible to perform the inclination correction of the reflection mirror simultaneously with the resonance frequency deviation adjustment.

The present invention is applicable to the optical scan device or the image display device which includes the resonance-type optical scanner having the reflection mirror for scanning light and scans light to form the scanning light by controlling the oscillations of the reflection mirror.

What is claimed is:

1. An optical scan device comprising:
   a resonance-type optical scanner including a reflection mirror which reflects incident light, a first beam portion which is connected to one side of the reflection mirror, a second beam portion which is connected to the other side of the reflection mirror, and a first piezoelectric element portion which resiliently deforms the first beam portion;
   a power source part which applies an AC voltage for oscillating the reflection mirror to the first piezoelectric element portion; and
   a reflection mirror displacement detector for detecting displacement of the reflection mirror, wherein
   the power source part applies the DC voltage component corresponding to a displacement range of the reflection mirror to the first piezoelectric element portion.

2. An optical scan device according to claim 1, wherein the reflection mirror displacement detector includes a light beam detector which detects the displacement range of the reflection mirror by receiving reflection light out of light incident on the reflection mirror.

3. An optical scan device according to claim 1, wherein
   the optical scan device includes the second piezoelectric element portion which resiliently deforms the second beam portion, and
   the reflection mirror displacement detector detects the displacement of the reflection mirror based on a voltage outputted from the second piezoelectric element portion.

4. An optical scan device according to claim 1, wherein
   the optical scan device includes a temperature sensor which detects a temperature of the piezoelectric element portion or an ambient temperature around the piezoelectric element portion, and
   the power source part applies the DC voltage component corresponding to the displacement range of the reflection mirror and the temperature detected by the temperature sensor to the first piezoelectric element portion.

5. An image display device including the optical scan device described in claim 1, wherein light modulated based on an image signal is optically scanned in two-dimensional directions using the optical scan device so as to display an image.

6. An optical scan device according to claim 1, wherein the power source part applies the AC voltage to the first piezoelectric element portion in a state that the AC voltage is superposed on the DC voltage component.

7. An optical scan device comprising:
   a resonance-type optical scanner including a reflection mirror which reflects incident light, a first beam portion which is connected to one side of the reflection mirror, a second beam portion which is connected to the other side of the reflection mirror, and a first piezoelectric element portion which resiliently deforms the first beam portion;
   a power source part which applies an AC voltage for oscillating the reflection mirror to the first piezoelectric element portion; and
   a mirror position detector which detects a position of the reflection mirror in a state that the AC voltage is not applied to the first piezoelectric element portion, wherein
   the first beam portion is constituted of a first spring portion which is connected to the reflection mirror and a plurality of second spring portions which is connected to the first spring portion and is formed on a fixed frame portion in a state that the second spring portions are branched from the first spring portion with a branching gap wider than a width of the first spring portion,
   the first piezoelectric element portion is constituted of a first piezoelectric element which allows one of the second spring portions to generate bending oscillations and a second piezoelectric element which allows the other of the second spring portions to generate bending oscillations, and
   the power source part applies the DC voltage component to the first piezoelectric element and/or the second piezoelectric element based on the position of the reflection mirror.

8. An optical scan device according to claim 7, wherein the mirror position detector includes a light beam detector which detects the position of the reflection mirror by receiving reflection light of light incident on the reflection mirror.

9. An optical scan device according to claim 7, wherein the optical scan device includes a second piezoelectric element portion which resiliently deforms the second beam portion, and
   the mirror position detector detects the position of the reflection mirror based on a voltage outputted from the second piezoelectric element portion.

10. An image display device including the optical scan device described in claim 7, wherein light modulated based on an image signal is optically scanned in two-dimensional directions using the optical scan device so as to display an image.

11. An optical scan device according to claim 7, wherein the power source part applies the AC voltage to the first piezoelectric element portion in a state that the AC voltage is superposed on the DC voltage component.

12. A method of changing a resonance frequency of an oscillator of a resonance-type optical scanner including a reflection mirror which reflects incident light, a first beam portion which is connected to one side of the reflection mirror, a second beam portion which is connected to the other side of the reflection mirror and a first piezoelectric element portion which resiliently deforms the first beam portion, the method comprising the steps of
   applying an AC voltage to the first piezoelectric element portion so as to oscillate the reflection mirror,
   detecting a displacement range of the reflection mirror, and
   applying a DC voltage component to the first piezoelectric element portion based on the displacement range of the reflection mirror.

13. A method of changing a resonance frequency of an oscillator of a resonance-type optical scanner including a reflection mirror which reflects incident light, a first beam portion which is connected to one side of the reflection mirror, a second beam portion which is connected to the other side of the reflection mirror, a first piezoelectric element portion which resiliently deforms the first beam portion and a second piezoelectric element portion which resiliently deforms the second beam portion, the method comprising the steps of
   applying an AC voltage to the first piezoelectric element portion so as to oscillate the reflection mirror,
   detecting a displacement range of the reflection mirror, and
   applying a DC voltage component to the second piezoelectric element portion based on the displacement range of the reflection mirror.

14. A method of correcting a reflection mirror position of a resonance-type optical scanner including a reflection mirror which reflects incident light, a first beam portion which is connected to one side of the reflection mirror, a second beam portion which is connected to the other side of the reflection mirror, a first piezoelectric element portion which resiliently deforms the first beam portion, and a reflection mirror position detector for detecting position of the reflection mirror, wherein the first beam portion is constituted of a first spring portion which is connected to the reflection mirror and a plurality of second spring portions which are connected to the first spring portion and are formed on a fixed frame portion in a state that the second spring portions are branched from the first spring portion with a branching gap wider than a width of the first spring portion, and the first piezoelectric element portion is constituted of a first piezoelectric element which allows one of the second spring portions to generate bending oscillations and a second piezoelectric element which allows another of the second spring portions to generate bending oscillations, the method comprising the steps of
   detecting a position of the reflection mirror, and
   applying a DC voltage component to the first piezoelectric element portion and/or the second piezoelectric element portion based on the position of the reflection mirror.

15. An optical scan device comprising:
   a resonance-type optical scanner including a reflection minor which reflects incident light, a first beam portion connected to one side of the reflection mirror, a second beam portion connected to the other side of the reflection mirror, a first piezoelectric element portion which resiliently deforms the first beam portion, and a second piezoelectric element portion which resiliently deforms the second beam portion;
   a power source part which applies an AC voltage for oscillating the reflection mirror to the first piezoelectric element portion; and
   a reflection mirror displacement detector for detecting displacement of the reflection mirror,
   wherein the power source part applies the DC voltage component corresponding to a displacement range of the reflection mirror to the first piezoelectric element portion.

* * * * *